US010657800B1

United States Patent
Fowler et al.

(10) Patent No.: US 10,657,800 B1
(45) Date of Patent: *May 19, 2020

(54) GUNSHOT DETECTION WITHIN AN INDOOR ENVIRONMENT

(71) Applicant: Shooter Detection Systems, LLC, Newburyport, MA (US)

(72) Inventors: Ronald A Fowler, Westford, MA (US); Richard Thomas Onofrio, Arlington, MA (US)

(73) Assignee: Shooter Detection Systems, LLC, Newburyport, MA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/684,925

(22) Filed: Aug. 23, 2017

Related U.S. Application Data

(63) Continuation-in-part of application No. 15/613,161, filed on Jun. 3, 2017, now abandoned, which is a
(Continued)

(51) Int. Cl.
*G08B 29/18* (2006.01)
*G08B 13/16* (2006.01)
(Continued)

(52) U.S. Cl.
CPC .......... *G08B 29/188* (2013.01); *G01S 3/8083* (2013.01); *G01S 5/20* (2013.01); *G08B 13/1672* (2013.01)

(58) Field of Classification Search
CPC ..... G08B 29/188; G08B 13/1672; G01S 5/20; G01S 3/8083
See application file for complete search history.

(56) References Cited

U.S. PATENT DOCUMENTS

| 3,145,365 A * | 8/1964 | Jacobs | G01H 3/005 |
| | | | 367/13 |
| 4,205,394 A * | 5/1980 | Pickens | G01V 13/00 |
| | | | 367/13 |

(Continued)

FOREIGN PATENT DOCUMENTS

| WO | WO0073811 A1 | 12/2000 |
| WO | WO2009046367 A1 | 4/2009 |

(Continued)

OTHER PUBLICATIONS

González-Castano, Francisco Javier, et al. "Acoustic sensor planning for gunshot location in national parks: A pareto front approach." Sensors 9.12 (2009): 9493-9512.

*Primary Examiner* — Daniel Pihulic
(74) *Attorney, Agent, or Firm* — Adams Intellex, PLC

(57) ABSTRACT

Techniques for gunshot detection in an indoor environment are disclosed. A gunshot sensor is placed in the indoor environment. The gunshot sensor includes multiple individual sensors, including, but not limited to, an acoustic sensor and an infrared sensor. A firearm typically emits energy within the infrared spectrum when fired. This energy is detected by the infrared sensor. A firearm also typically emits an acoustic pressure wave when fired. The acoustic sensor detects the acoustic pressure wave. A strobe from a fire alarm occurring near in time to the gunshot can cause false gunshot detection. The infrared sensor information and the acoustic sensor information are analyzed to determine that a gunshot has occurred. The gunshot determination takes place independently of the location of the gunshot sensor. The strobe occurrence is evaluated to provide gunshot false alert detection. Reverberations are not used in the determination of a gunshot false alert.

22 Claims, 19 Drawing Sheets

Related U.S. Application Data continuation-in-part of application No. 15/498,283, filed on Apr. 26, 2017.

(60) Provisional application No. 62/429,754, filed on Dec. 3, 2016, provisional application No. 62/379,023, filed on Aug. 24, 2016, provisional application No. 62/345,465, filed on Jun. 3, 2016, provisional application No. 62/327,552, filed on Apr. 26, 2016.

(51) Int. Cl.
*G01S 3/808* (2006.01)
*G01S 5/20* (2006.01)

(56) References Cited

U.S. PATENT DOCUMENTS

| | | | |
|---|---|---|---|
| 4,375,679 A * | 3/1983 | Park, Jr. | G01V 13/00 367/13 |
| 5,930,202 A | 7/1999 | Duckworth et al. | |
| 6,178,141 B1 | 1/2001 | Duckworth et al. | |
| 6,621,764 B1 * | 9/2003 | Smith | F41H 11/00 367/128 |
| 6,847,587 B2 | 1/2005 | Patterson et al. | |
| 7,203,132 B2 | 4/2007 | Berger | |
| 7,233,546 B2 * | 6/2007 | Berkovich | G01S 11/12 367/128 |
| 7,266,045 B2 | 9/2007 | Baxter et al. | |
| 7,411,865 B2 | 8/2008 | Calhoun | |
| 7,474,589 B2 | 1/2009 | Showen et al. | |
| 7,532,542 B2 | 5/2009 | Baxter et al. | |
| 7,586,812 B2 | 9/2009 | Baxter et al. | |
| 7,599,252 B2 | 10/2009 | Showen et al. | |
| 7,602,329 B2 | 10/2009 | Manderville et al. | |
| 7,688,679 B2 | 3/2010 | Baxter et al. | |
| 7,710,278 B2 | 5/2010 | Holmes et al. | |
| 7,719,428 B2 | 5/2010 | Fisher et al. | |
| 7,732,769 B2 * | 6/2010 | Snider | G06K 9/00771 250/336.1 |
| 7,750,814 B2 | 7/2010 | Fisher et al. | |
| 7,751,282 B2 | 7/2010 | Holmes et al. | |
| 7,755,495 B2 | 7/2010 | Baxter et al. | |
| 7,796,470 B1 | 9/2010 | Lauder et al. | |
| 7,855,935 B1 | 12/2010 | Lauder et al. | |
| 7,947,954 B2 * | 5/2011 | Snider | G06K 9/00771 250/336.1 |
| 7,961,550 B2 | 6/2011 | Calhoun | |
| 8,036,065 B2 | 10/2011 | Baxter et al. | |
| 8,063,773 B2 | 11/2011 | Fisher et al. | |
| 8,134,889 B1 | 3/2012 | Showen et al. | |
| 8,304,729 B2 * | 11/2012 | Snider | G06K 9/00771 250/336.1 |
| 8,325,562 B2 | 12/2012 | Showen | |
| 8,325,563 B2 | 12/2012 | Calhoun et al. | |
| 8,351,297 B2 | 1/2013 | Lauder et al. | |
| 8,369,184 B2 | 2/2013 | Calhoun | |
| 8,478,319 B2 | 7/2013 | Azimi-Sadjadi et al. | |
| 8,642,961 B2 * | 2/2014 | Snider | G06K 9/00771 250/336.1 |
| 8,995,227 B1 | 3/2015 | Johnson | |
| 9,240,114 B2 | 1/2016 | Showen et al. | |
| 2004/0100868 A1 | 5/2004 | Patterson, Jr. et al. | |
| 2008/0219100 A1 | 9/2008 | Fisher et al. | |
| 2010/0058947 A1 | 3/2010 | Davis et al. | |
| 2010/0278013 A1 | 11/2010 | Holmes et al. | |
| 2012/0300587 A1 | 11/2012 | Azimi-Sadjadi et al. | |
| 2013/0343602 A1 * | 12/2013 | Snider | G06K 9/00771 382/103 |
| 2014/0361886 A1 | 12/2014 | Cowdry | |
| 2015/0070166 A1 | 3/2015 | Boyden et al. | |
| 2015/0071038 A1 | 3/2015 | Boyden et al. | |
| 2015/0177363 A1 | 6/2015 | Hermann et al. | |
| 2015/0268170 A1 | 9/2015 | Scott | |
| 2015/0347902 A1 | 12/2015 | Butler, Jr. et al. | |
| 2016/0086472 A1 | 3/2016 | Herrera et al. | |
| 2016/0133107 A1 | 5/2016 | Showen et al. | |
| 2016/0203809 A1 * | 7/2016 | Brock-Fisher | B06B 1/0292 600/459 |
| 2016/0225242 A1 | 8/2016 | Kane et al. | |
| 2016/0232774 A1 * | 8/2016 | Noland | G08B 13/1672 |
| 2016/0260307 A1 | 9/2016 | Skorpik et al. | |
| 2016/0358393 A1 * | 12/2016 | Penland | G08B 15/00 |
| 2017/0123038 A1 | 5/2017 | Griggs et al. | |
| 2017/0169686 A1 | 6/2017 | Skorpik et al. | |
| 2019/0180728 A1 * | 6/2019 | Alie | A61B 8/00 |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

* cited by examiner

GUNSHOT DETECTION WITHIN AN INDOOR ENVIRONMENT

RELATED APPLICATIONS

This application claims the benefit of U.S. provisional patent applications "Gunshot Detection within an Indoor Environment" Ser. No. 62/379,023, filed Aug. 24, 2016, and "Testing of Gunshot Sensors" Ser. No. 62/429,754, filed Dec. 3, 2016.

This application is also a continuation-in-part of U.S. patent application "Indoor Gunshot Detection Analysis with Ongoing Fire Alarm" Ser. No. 15/613,161, filed Jun. 3, 2017, which claims the benefit of U.S. provisional patent applications "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The application "Indoor Gunshot Detection Analysis with Ongoing Fire Alarm" Ser. No. 15/613,161, filed Jun. 3, 2017 is also a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

Each of the foregoing applications is hereby incorporated by reference in its entirety.

FIELD OF ART

This application relates generally to gunshot detection and more particularly to gunshot detection within an indoor environment.

BACKGROUND

Gun violence has become a widely publicized issue in recent years. According to recent statistics, one in three people in the United States knows someone who has been shot. On average, 31 Americans are murdered with guns every day and 151 are treated for a gun assault in an emergency room. In 2015 alone, more than 12,000 people were killed in the United States by a gun, and many others were injured. Gun violence has unfortunately occurred in a variety of public places, such as schools, places of worship, sporting event venues, nightclubs, and airports. While the use of metal detectors and other security measures are frequently employed in an attempt to prevent firearms in such venues, incidents of gun violence in public continue to be a major issue.

Gunshot detection by electronic devices, rather than by humans, is performed for a variety of purposes and applications that include the military, law enforcement, security, and public safety. Gunshot detection is a complex task because of the sheer variety of weapons and explosive devices that can produce the gunshot event. Identifying the point of origin of the gunshot is critical to identifying and tracking a suspected shooter. The identification of the source of the gunshot is complicated by many factors including the spatial environment in which the gunshot event occurs. Gunshot detection and shooter identification are critical elements in many military, law enforcement, security, and public safety scenarios.

Some early work in detecting gunshots in an outdoor setting involved several microphones spread out over a large distance. A gunshot is often so loud it can be heard many thousands of feet away in an outdoor setting. The occurrence of a gunshot would then register on the microphones, but at slightly different times. Because the speed of sound in dry air at sea level at 68° Fahrenheit is about 1125 feet/second, a gunshot somewhere between two microphones that are 2500 feet apart would be detected at the microphones one or even two seconds apart, which is an easily detectable difference. Furthermore, the relative times of detection are an indication of the proximity of the gunshot to one microphone versus another microphone. Unfortunately, this scheme cannot distinguish between gunshots and other similar explosive sounds, such as car backfires, construction noises, fireworks, etc.

The problem of gunshot detection indoors is many times more complicated than gunshot detection outdoors. In indoor settings, many complicating factors intrude upon accurate gunshot detection. For example, in an indoor setting, the probability of extensive sound reverberations and echoes from the initial gunshot is very high. In addition, rooms within the indoor setting often have convoluted acoustic pathways. These acoustic pathways are often blocked by closed doors, which cause many decibels of sound attenuation. Furthermore, indoor settings are often spread over multiple floors and replete with crowds of people, which makes dealing with indoor gunshots extremely challenging for law enforcement officers or other public safety personnel. Additionally, many other distracting sonic and visual interferences may be present in a crowded, indoor environment, including screams, flashlights, police alarms, building alarms, fire alarms, earthquake alarms, tornado alarms, and the like. Gunshot detection in an indoor environment is an important element of public safety.

SUMMARY

Gun violence continues to adversely affect society in indoor venues such as schools, places of worship, sporting events, nightclubs, and airports. External environmental factors such as sirens and lights from fire alarms, or loud music and flashing lights in nightclubs, can cause challenges for indoor gunshot detection. Disclosed embodiments provide techniques that utilize one or more position-independent gunshot sensors. Embodiments provide a processor-implemented method for gunshot analysis. The method can include collecting infrared information within an indoor environment using a gunshot sensor. The gunshot sensor can include an acoustic sensor and an infrared sensor. The method can include collecting acoustic information within the indoor environment using the gunshot sensor, analyzing the infrared information and the acoustic information to determine a gunshot occurrence wherein the gunshot occurrence is determined independently of the gunshot sensor location, and evaluating strobe occurrences, based on the infrared information and the acoustic information, and using the strobe occurrence to provide gunshot false alert detection. Thus, the disclosed embodiments are configured to minimize false-positives due to these external environmental factors. A processor-implemented method for gunshot analysis is disclosed comprising: collecting infrared information within an indoor environment using a gunshot sensor; collecting acoustic information within the indoor environment using the gunshot sensor; analyzing the infrared information and the acoustic information to determine a gunshot occurrence wherein the gunshot occurrence is determined independently of location for the gunshot sensor; and evaluating strobe occurrence, based on the infrared information and the acoustic information, and using the strobe occurrence to provide gunshot false alert detection.

In embodiments, a processor-implemented method for gunshot analysis is disclosed comprising: collecting infrared information within an indoor environment using a gunshot sensor; collecting acoustic information within the indoor environment using the gunshot sensor; analyzing the infrared information and the acoustic information to determine a gunshot occurrence wherein the gunshot occurrence is determined independently of location for the gunshot sensor; engaging video collection, based on the gunshot occurrence; and performing video analytics for tracking a suspected shooter for the gunshot occurrence based on the video collection. In yet other embodiments, a computer program product embodied in a non-transitory computer readable medium for gunshot analysis is disclosed, the computer program product comprising code which causes one or more processors to perform operations of: collecting infrared information within an indoor environment using a gunshot sensor; collecting acoustic information within the indoor environment using the gunshot sensor; analyzing the infrared information and the acoustic information to determine a gunshot occurrence wherein the gunshot occurrence is determined independently of location for the gunshot sensor; and evaluating strobe occurrence, based on the infrared information and the acoustic information, and using the strobe occurrence to provide gunshot false alert detection.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
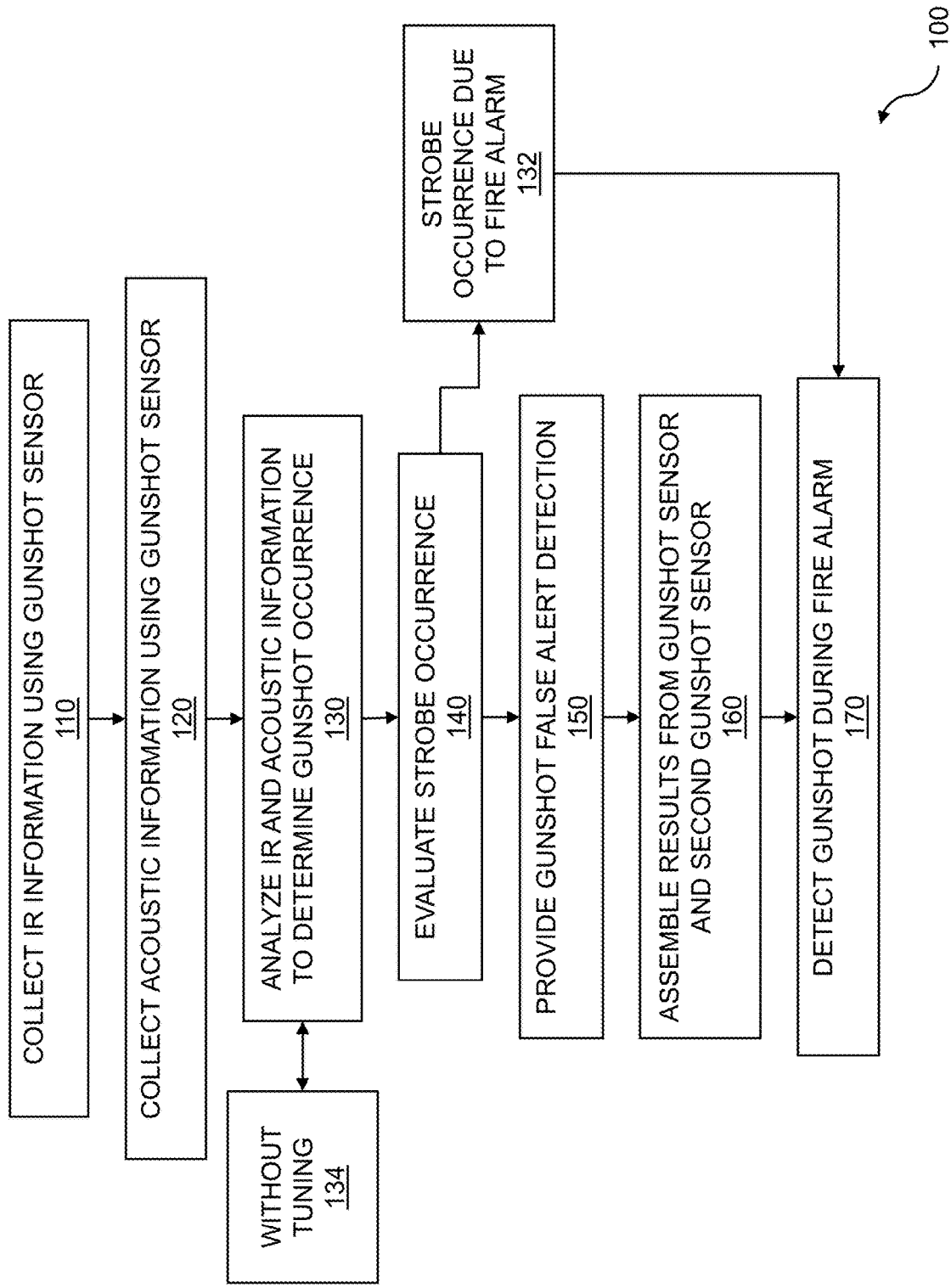
FIG. 1 is a flow diagram for indoor gunshot detection.

Detection of gunshots within an indoor environment is described herein. It is crucial to be able to identify true gunshots, with their corresponding muzzle flashes and loud acoustic signatures, while at the same time eliminating any false alerts. A gunshot sensor can be placed in an indoor environment. The gunshot sensor can include multiple individual sensors, including, but not limited to, an acoustic sensor and an infrared (IR) sensor. The acoustic sensor can detect the acoustic pressure wave that is often emitted by a firearm when it is fired. Additionally, a firearm typically emits energy within the infrared spectrum when fired. Thus, by detecting the infrared emission coincidental with a detected acoustic pressure wave, a presumption of a gunshot can be inferred. The acoustic sensor can be configured to detect the initial pressure wave emitted from a firearm. In essence, the acoustic sensor can only detect very loud, sudden bursts of acoustic energy associated with a gunshot, such as shock waves and/or loud blasts. Other noises, such as loud music, slamming doors, and voices do not generally trigger the acoustic pressure sensor, however, other IR events, such as the strobe light often associated with a fire alarm or other alarm, can trigger infrared sensor activation.

Thus, disclosed sensors provide numerous advantages. One such advantage is a legal benefit in that the acoustic sensor does not record voices as a traditional microphone would. This maintains privacy in the indoor environment, as the acoustic sensor does not pick up conversations that might be transpiring in the environment. Another key advantage is that the acoustic sensor is configured to detect the primary acoustic wave from the firearm, but is unlikely to pick up reverberations and echoes from reflected sound waves. Since these secondary acoustic waves that might be reflected from walls and other surfaces in the indoor environment are mostly ignored by the acoustic sensor, it facilitates a position-independent gunshot sensor. There is no need for special calibrations for a given indoor environment. This is particularly advantageous in large indoor environments such as schools, airports, gymnasiums, and sporting arenas. Thus, the analyzing can be accomplished without tuning the gunshot sensor for the indoor environment in which the gunshot sensor resides. Furthermore, the analyzing can provide a distance from the shooter to the sensor. In some environments, multiple gunshot sensors can be used. The installation of the gunshot detection system in these indoor environments is straightforward and time-efficient because there is no need to specifically select a particular position within the indoor environment, nor is there a need for any pre-use calibration. This enables the disclosed systems to be quickly and efficiently installed in indoor environments, providing the desired gunshot detection in important transportation venues, entertainment venues, hospitals, and other large, public, indoor environments.

In some configurations, multiple gunshot sensors are used. The multiple sensors are connected to a gateway device that receives feedback from the gunshot sensors and can report the data upstream to a monitoring system, emergency warning system, or another suitable system. In some configurations, the gunshot sensor can further include a video camera and a microphone. The microphone can be connected to a pickup circuit with its gain set such that the microphone only picks up very loud noises (e.g. 110-130 decibels or greater), such as a muzzle blast, and does not pick up ordinary conversation. In some embodiments, a lower decibel threshold is set to enable detection of acoustically suppressed or lower caliber weapons. In some embodiments, a video management system is integrated and enabled to provide various notification services. In some embodiments, the video camera and microphone are only activated after a gunshot detector detects a possible gunshot. Thus, if a gunshot is detected in the indoor environment, the microphone and video camera can be activated to attempt to record audio and video of the scene and possibly record audio and video of the suspect(s) that fired the gunshot. In such embodiments, the gunshot sensor enters a surveillance mode once a gunshot has been detected, and the gain of the microphone circuit can be adjusted to pick up additional sounds. The recorded audio and video information can be of tactical importance to law enforcement so that they can better understand the extent of injuries and casualties, as well as to assess the number of shooters on the scene.

Another challenge of gunshot detection in an indoor environment is the various external environmental factors that can occur in temporal proximity to a gunshot. For example, a fire alarm can create a very loud noise, as well as a flashing strobe. In a nightclub, music can be very loud, and there might be a multitude of strobes and other flashing lights. Disclosed systems can accommodate such environmental factors and still provide effective gunshot detection with one or more position-independent gunshot sensors placed within an indoor environment, thus providing effective and efficient gunshot monitoring, and improving public safety.

A typical firearm discharge involves various phenomena. There is a muzzle flash, which emits visible and infrared light. A muzzle flash typically is comprised of multiple phases, which include a primary flash, an intermediate flash, and a secondary flash. The primary flash results as hot, highly compressed gases, which are the unburned propellants, exit the barrel along with the projectile. These gases expand rapidly, not mixing with the atmosphere, then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is in the infrared (IR) region. This is in contrast to other environmental factors within an indoor environment, such as fire alarm strobes. The light a fire alarm strobe emits is mostly in the visible spectrum, with a much lower IR component. Thus, detecting IR energy is an important aspect of gunshot detection.

A shock wave can also occur, which is caused by the supersonic travel of the projectile/bullet. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most events within an indoor environment do not cause a shock wave. For example, a door slamming, while perceived as loud to someone within its hearing, does not cause a shock wave such as that resulting from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet out of the gun barrel. The hot, rapidly expanding gases cause a muzzle blast to emerge from the barrel. The acoustic disturbance can have a duration in the range of 3 to 5 milliseconds and propagates through the air at the speed of sound.

FIG. 1 is a flow diagram 100 for indoor gunshot detection. The flow 100 includes collecting infrared information within an indoor environment using a gunshot sensor 110. In embodiments, the infrared information collected comprises energy at near-infrared wavelengths such as those ranging from 0.78-3 microns. The flow 100 includes collecting acoustic information within the indoor environment using the gunshot sensor 120. The acoustic information can include detection of a shock wave and/or a sound wave. The shock wave and/or the sound wave are detected with an acoustic sensor. The shock wave emanates from the projectile as it travels through the air at supersonic speeds. The acoustic information can include the sound wave from the gun itself. The sound wave may be detected by a microphone that is coupled to a pickup circuit with its gain configured to only detect very loud sounds (e.g. 110-130 decibels or greater). In embodiments, the acoustic information includes only the sound wave from the gun itself. In this case, the shock wave could have been attenuated, missing, or otherwise misdirected such that it is not included and not necessary or required to detect and confirm the gunshot.

The flow 100 includes analyzing the infrared information and the acoustic information to determine a gunshot occurrence, wherein the gunshot occurrence is determined independently of location for the gunshot sensor 130. The analysis can include identification of a shock wave, an infrared pattern, and/or a sound wave pattern. These three inputs can be used to probabilistically detect that a gunshot occurred. In embodiments, a score is computed based on the detected levels and characteristics of these three inputs. If the computed score is above a predetermined level, then a gunshot is deemed to have likely occurred.

In embodiments, a spectral signature is identified and can include specifics for light emitted like that seen in near-infrared wavelengths. The duration might vary depending on the firearm from less than 1 to 7 milliseconds. In embodiments, the duration is up to 7.5 milliseconds. Regarding acoustic information, shock waves are typically formed due to events such as supersonic travel of a projectile, or a nearby lightning strike. The sound wave is a loud sound emitted from the firearm upon discharge. Other factors in an indoor environment can also cause loud sounds, such as fire alarms, doors slamming, books dropping, and the like.

Complicating the gunshot detection is the fact that one or more of the three aforementioned inputs may be at a low level or undetectable, depending on the orientation and position of the firearm (gun) in relation to the gunshot sensor. For example, infrared information typically requires a line-of-sight between the gunshot sensor and the gun. Shock waves mostly travel perpendicular to the projectile path, and thus, the detected shock wave is a function of relative angle between the gunshot and the gunshot sensor. Finally, the sound wave from the muzzle blast can be comingled with other loud sounds in the indoor environment such as fire alarm sirens and/or buzzers.

The flow 100 includes evaluating strobe occurrence 140, based on the infrared information and the acoustic information, and using the strobe occurrence to provide gunshot false alert detection. In the flow 100, the strobe occurrence comprises a fire alarm 132, which can affect the gunshot detection. A loud buzzer can be sounded with a periodicity and a strobe associated with the fire alarm might be periodically illuminated. While the strobe might radiate primarily in the visual range, there can be an infrared component to the strobe. Thus, by evaluating strobe occurrence, a more accurate detection of the gunshot is achieved, because the gunshot detector can be configured to automatically window out, or ignore, sensory input during the brief periods of strobe activation. In the flow 100, the analyzing can occur irrespective of reverberations. As an example, the infrared component is not impacted by reverberations, so that component can be used with a higher weight than the sound wave information, which is affected by reverberations.

In the flow 100, the gunshot sensor can collect the acoustic information wherein the reverberations from the gunshot occurrence add cumulatively to the acoustic information. The analyzing can occur irrespective of reflections in the flow 100, and the gunshot sensor can collect the infrared information wherein the reflections from the gunshot occurrence add cumulatively to the infrared information. In the flow 100, information on the reflections is not used in false alert of gunshot detection 150. For example, by utilizing acoustic information from a shock wave along with an infrared spectral signature, a gunshot detection determination can be made using inputs that are not affected by reverberations. In embodiments, information on the reverberations is not used in false alert of gunshot determinations. In situations where the inputs of shock wave and infrared spectral signature are not present (i.e. due to gun orientation in relation to the gunshot sensor), the sound wave information can be used. A thresholding circuit can be coupled to the acoustic sensor that is configured for sound wave detection. The thresholding circuit can be configured to trigger upon detection of a loud sound (e.g. 130 decibels or greater), and then stay active for a predetermined duration (e.g. 10 milliseconds), followed by a muting for a predetermined duration (e.g. 50 milliseconds). In this way, the acoustic sensor mutes and thus can ignore reverberations that occur in an indoor environment immediately following a firearm discharge.

In embodiments, a lower threshold is used to trigger gunshot detection of an acoustically suppressed or lower caliber weapon. A threshold of less than 120 decibels is enabled by triggering on IR information, collecting lower decibel acoustic information, and filtering out strobe occurrences due to an on-going fire alarm or other alarm. The lower threshold is enabled without tuning because of the IR-acoustic sequence with spurious IR (strobe) rejection. Thus, a low-threshold gunshot sensor is provided in embodiments.

In the flow 100, the analyzing can be accomplished without tuning the gunshot sensor 134 for the indoor environment in which the gunshot sensor resides. Since the gunshot sensor of disclosed embodiments utilizes multiple inputs to determine the probability of a gunshot, calibration or knowledge of a specific position within the premises is not needed in order to start using the system. A gunshot sensor can simply be installed on the premises to start monitoring for gunshots.

The flow 100 includes assembling results from the gunshot sensor along with a second gunshot sensor in a gateway device 160. The gateway device can be used to collect information from multiple gunshot sensors installed within premises. For example, in a large building such as a school, there can be several gunshot sensors installed in each hallway, and multiple gunshot sensors installed in large areas such as a gymnasium and cafeteria. The gateway device can collect information from each gunshot sensor and forward the information upstream to another system such as a security system. Additionally, in some embodiments, the gateway device communicates configuration and/or control information to each of the connected gunshot sensors. In the flow 100, assembling the results is accomplished independently of the locations for the gunshot sensor and the second gunshot sensor. This greatly simplifies the installation and setup of a gunshot detection system using gunshot sensors of disclosed embodiments.

The flow 100 includes detection of a gunshot during a fire alarm 170. By utilizing the multiple inputs as previously described, disclosed embodiments detect a gunshot even in the presence of a disruptive event such as a fire alarm. In this way, even if an assailant tries to mask the gunshot sounds by first setting off a fire alarm, disclosed embodiments that utilize the described techniques facilitate detection of gunshots, despite the noisy conditions of a fire alarm with an accompanying strobe. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
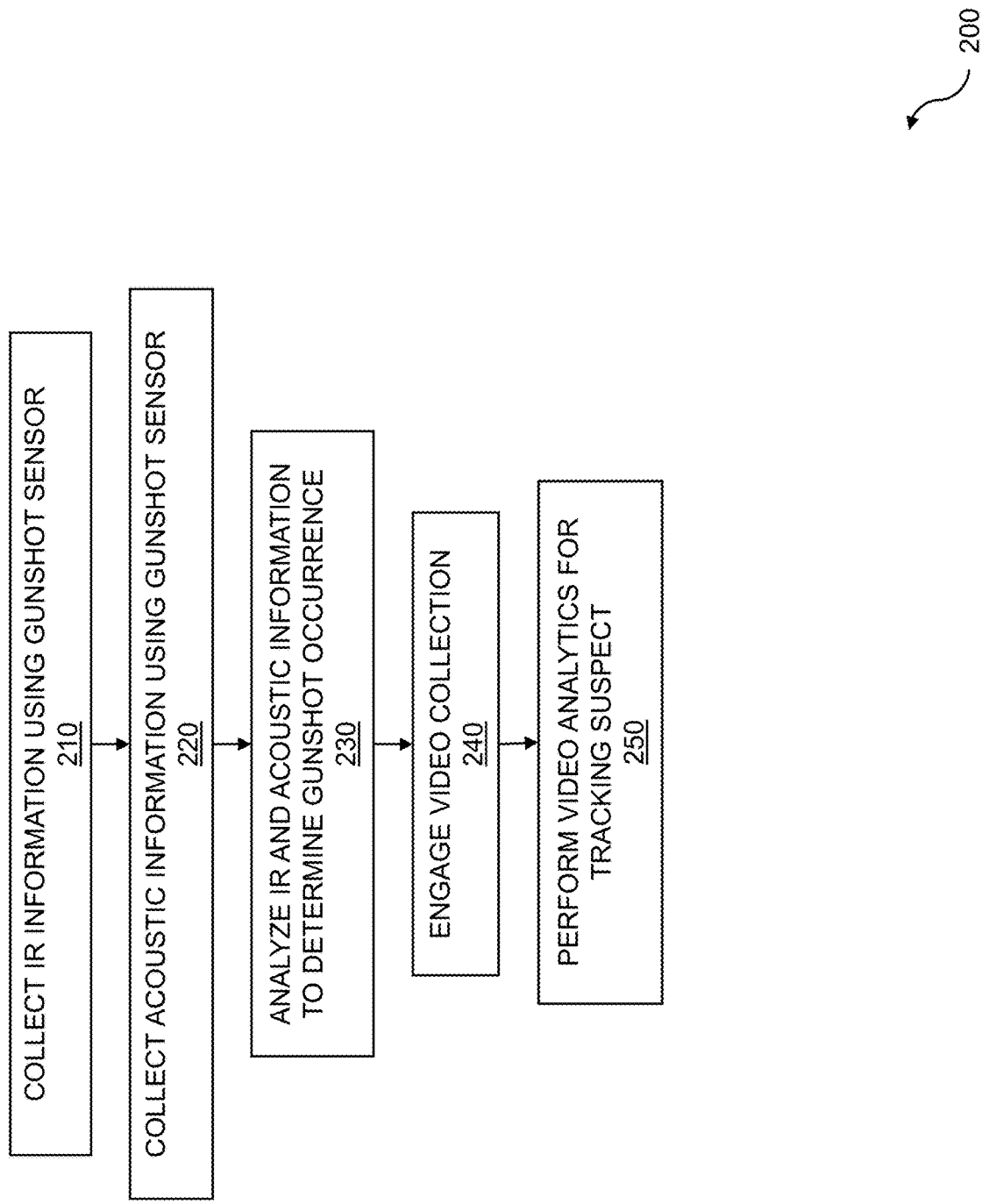
FIG. 2 is a flow diagram for gunshot analysis.

FIG. 2 is a flow diagram for gunshot analysis. The flow 200 includes collecting infrared information within an indoor environment using a gunshot sensor 210. In embodiments, the infrared information collected comprises energy at near-infrared wavelengths.

The flow 200 includes collecting acoustic information within the indoor environment using the gunshot sensor 220. The acoustic information can include detection of a shock wave, as well as the sound wave from the gun itself. The sound wave can be detected by a microphone that is coupled to a pickup circuit with its gain configured to only detect very loud sounds (e.g. 130 decibels or greater). A thresholding circuit can be coupled to the acoustic sensor that is configured for sound wave detection. The thresholding circuit can be configured to trigger upon detection of a loud sound (e.g. 130 decibels or greater), and then stay active for a predetermined duration (e.g. 10 milliseconds), followed by a muting for a predetermined duration (e.g. 50 milliseconds). In this way, the acoustic sensor mutes and thus can ignore reverberations that occur in an indoor environment immediately following a firearm discharge. The duration can vary depending on the type of firearm.

The flow 200 includes analyzing the infrared information and the acoustic information to determine a gunshot occurrence wherein the gunshot occurrence is determined independently of the gunshot sensor location 230. The analysis can include identification of a shock wave, an infrared pattern, and/or a sound wave pattern. These three inputs can be used in conjunction to probabilistically detect that a gunshot occurred. In embodiments, a score is computed based on the detected levels of these three inputs. If the computed score is above a predetermined level, then a gunshot is deemed to have likely occurred.

The flow 200 includes engaging video collection based on the gunshot occurrence 240. In such embodiments, the gunshot sensor includes a video system. The video system can be activated upon detection of a possible gunshot. The flow 200 includes performing video analytics for tracking a suspected shooter for the gunshot occurrence based on the video collection 250. The video analytics can utilize image classifiers, where the image classifiers can be used to identify a gun type. The suspected shooter can be identified based on the video analytics. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
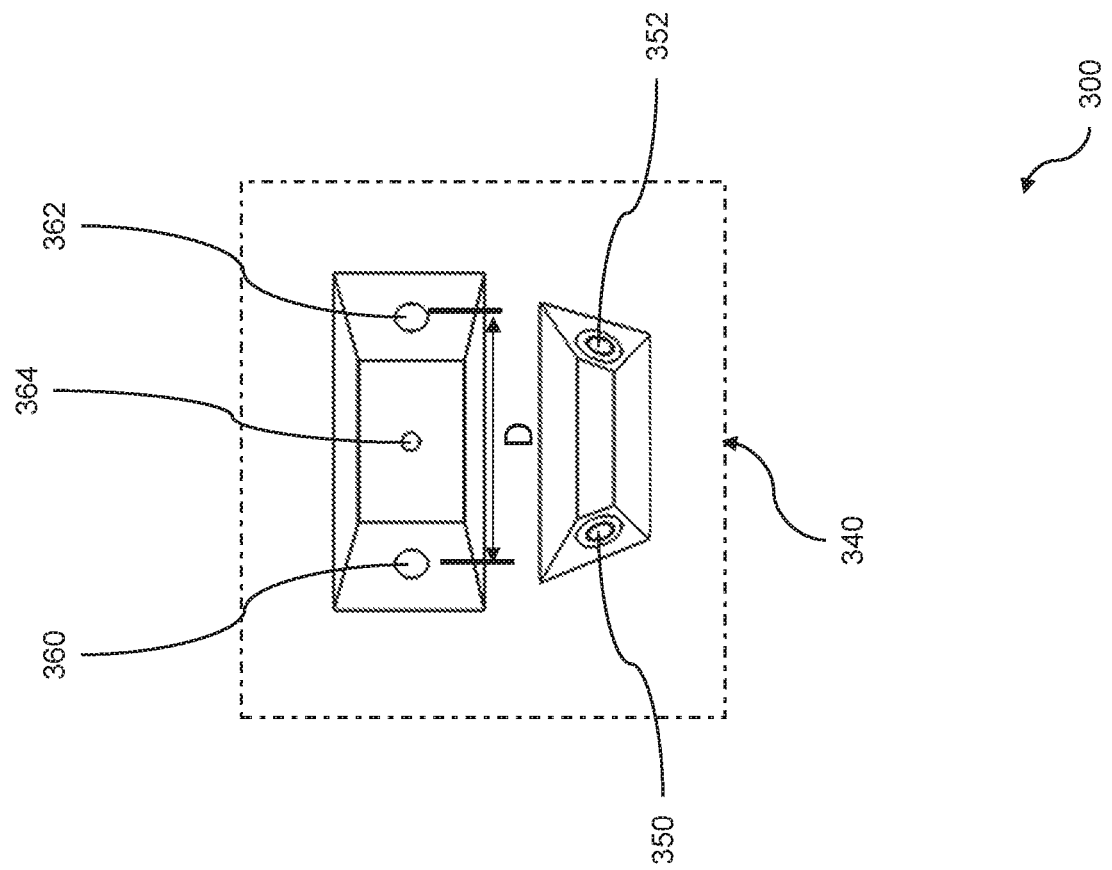
FIG. 3 is a diagram of a gunshot sensor unit.
Figure 3:
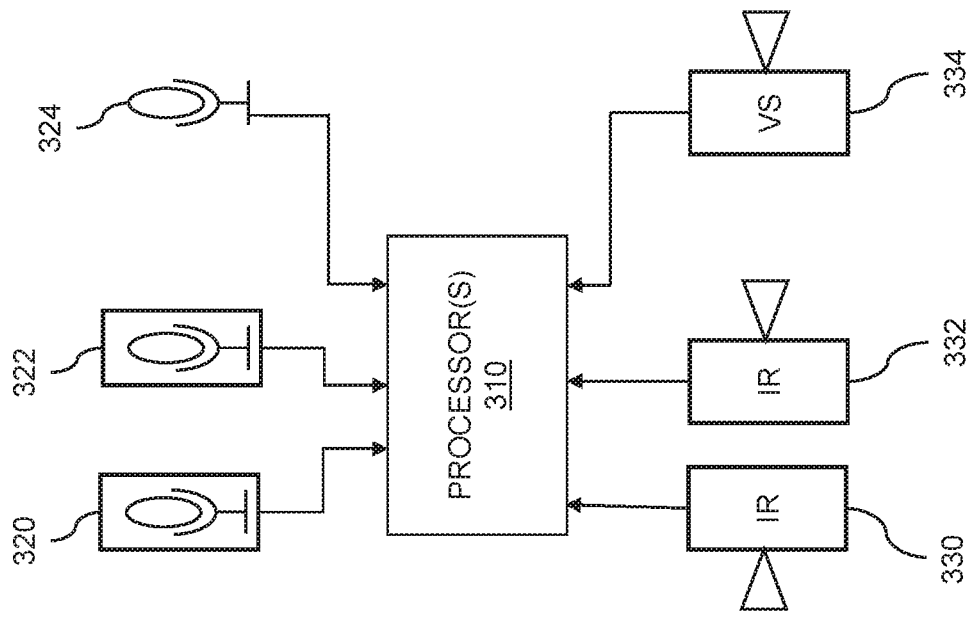

FIG. 3 is a diagram of a gunshot sensor unit. Indoor gunshot detection can be based on infrared information and acoustic information, where both types of information can be obtained within an indoor environment. Video collection can be initiated based on the detecting of the gunshot. Video analytics can be performed for tracking a suspected shooter of the gunshot using the collected video. An audio microphone can be activated based on the detection of the gunshot. The tracking of the shooter can be further based on the audio microphone that was activated. An example of a sensor unit 300 is shown for indoor gunshot detection. A sensor can include one or more processors 310, two infrared sensors 330 and 332, two acoustic sensors 320 and 322, and a microphone 324. The microphone 324 can be a surveillance microphone that is normally disabled and is only enabled in response to detection of a possible gunshot. The infrared sensors 330 and 332 can be used to obtain infrared information, where the infrared information can include a muzzle flash, a flash from an explosion, heat from a flame, etc. The acoustic sensors 320 and 322 can be used to detect sound pressure levels (SPL) events such as shock waves, where the sound pressure levels of the events can be compared to the SPLs of muzzle blasts from gunfire, explosions, and other events. The microphone 324 can be activated based on detecting a gunshot. The microphone 324 can be used for tracking a suspected shooter. The microphone can be activated for a first limited period of time. The first limited period of time can include times when the microphone is active, and any audio information collected during the first limited period of time can be used for a variety of reasons, such as diagnostic purposes. The microphone can stay active for a second limited period of time. The second period of time can be used for information gathering, including tracking information. The information collected from the microphone can be discarded after a third limited period of time. The discarding of information collected by the microphone can serve various purposes including security, confidentiality, and so on.

In some embodiments, the microphone 324 is configured to be operative during normal conditions at a very low gain, such that it only detects sounds in excess of 130 decibels. In this way, the microphone 324 can be used to detect sounds from gunshots without picking up other sounds, such as conversations. Once a gunshot is detected, the gain is adjusted so that the microphone 324 can pick up additional information to help law enforcement assess the situation. Thus, once a gunshot is detected, the microphone gain can be adjusted to pick up sounds at a lower sound level (e.g. 50 decibels) so that conversations and other sounds can be detected during the emergency situation.

A gunshot sensor can further include a video system 334. The video system 334 can include a video camera and additional sensors to capture video data and can be configured to activate upon detection of a possible gunshot. Embodiments perform video analytics based on video obtained from the video system 334. The video analytics can track a suspected shooter of the gunshot using the collected video.

An example gunshot sensor 340 is shown. The sensor 340 can include infrared (IR) sensors 350 and 352, acoustic sensors 360 and 362, and a microphone 364. The acoustic sensors 360 and 362 can be oriented at different angles and spaced apart by a distance D. In some embodiments, the distance D is 1.25 inches. Since a shock wave from a bullet is directional, one of the acoustic sensors (e.g. 360) might detect the shock wave while the other sensor (e.g. 362) might not. This information can be used as part of a forensics analysis to estimate a trajectory of a fired projectile/bullet. Similarly, the IR sensors 350 and 352 can also be disposed at different angles to increase the range of coverage within the indoor environment.

The gunshot sensor can include video cameras and an analyzer. The analyzer can be used to detect a gunshot, in an indoor environment, based on the infrared information and the acoustic information. In embodiments, the analyzer is implemented by code executing on the one or more processors 310. The analyzer, or gateway, can perform video analytics based on video obtained from the video cameras. The video analytics can track a suspected shooter of the gunshot using the video that was collected. The acoustic sensors 360 and 362 can be oriented at different angles and spaced apart by a distance D. In some embodiments, the distance D is 1.25 inches. Since a shock wave from a bullet is directional, one of the acoustic sensors (e.g. 360) might detect the shock wave while the other sensor (e.g. 362) might not. This information can be used as part of a forensics analysis to estimate the trajectory of a fired projectile/bullet. Similarly, the IR sensors 350 and 352 can also be disposed at different angles to increase the area of coverage. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the sensor 340 is sized appropriately to fit into a standard 4×4 inch opening such as an opening used for a double light switch or a double electrical receptacle. In this way, gunshot sensors of disclosed embodiments are easily installed within existing infrastructure.

Thus, the gunshot sensor can comprise an infrared sensor and an acoustic sensor. Furthermore, the gunshot sensor can further comprise a second infrared sensor and a second acoustic sensor. The infrared sensor and the second infrared sensor can be pointed to cover different fields of view. The acoustic sensor and the second acoustic sensor can be configured not to detect voices, unless specifically enabled under certain conditions. The acoustic sensors can be configured to detect shock waves, and/or very loud sounds (e.g. 110-130 decibels or higher).

Figure 4:
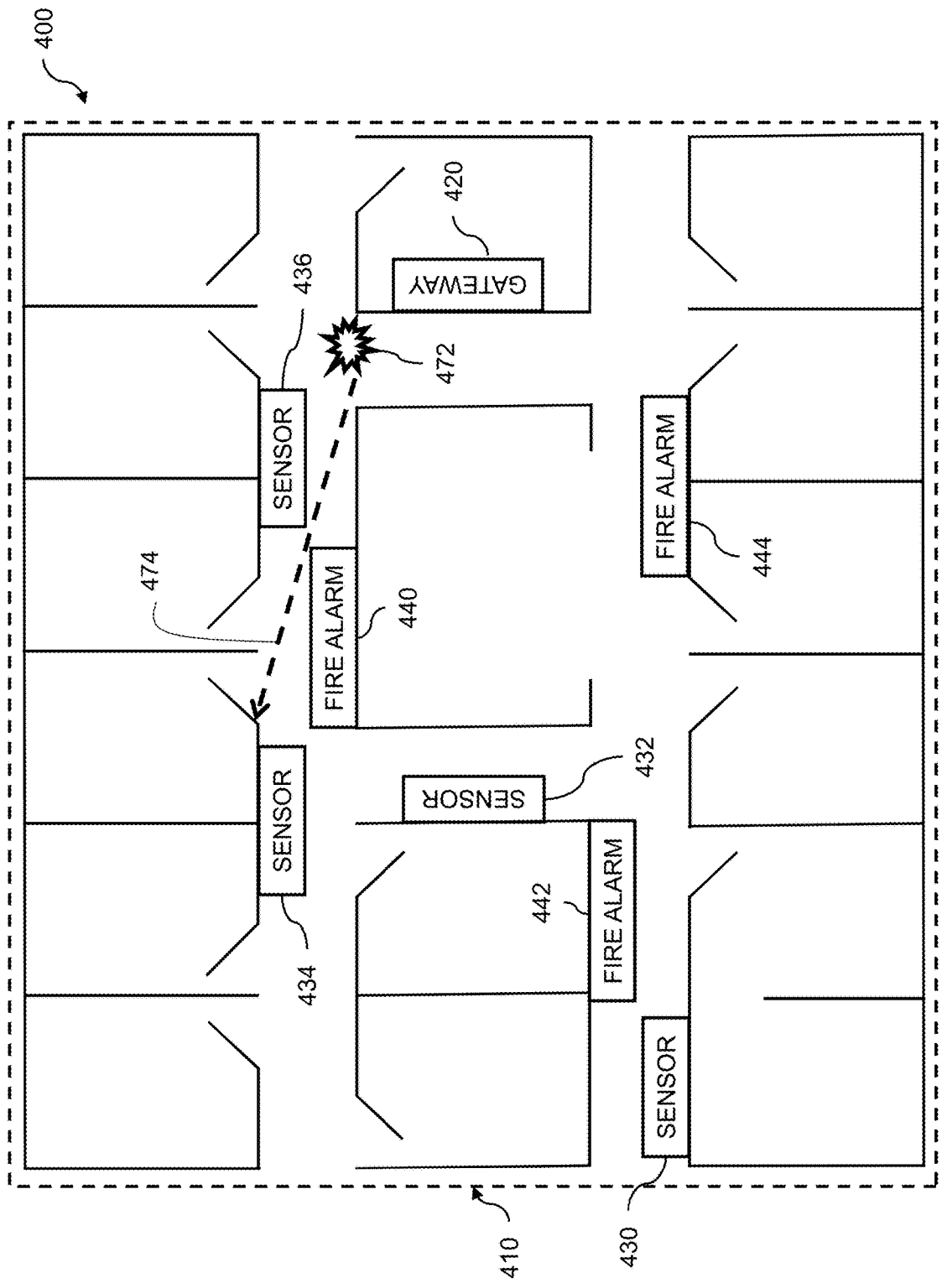
FIG. 4 is an example indoor sensor configuration.

FIG. 4 is an example of a sensor configuration within an indoor area. The indoor area 400 has a perimeter 410 and can be similar to an office environment, with a plurality of individual rooms. A plurality of gunshot sensors 430, 432, 434, and 436 are installed at various positions within the area 400. A plurality of fire alarms 440, 442, and 444 are also installed at various positions within the area 400. A gateway 420 is installed within the area 400, and is configured to receive inputs from the plurality of gunshot sensors 430, 432, 434, and 436. In embodiments, the gateway 420 communicates with the gunshot sensors via a wired communication interface, such as Ethernet or RS-232. In other embodiments, the gateway 420 communicates with the gunshot sensors via a wireless interface such as WiFi. In such embodiments, each gunshot sensor is further equipped with a WiFi communication interface. The gateway 420 can include both wireless and wired communication interfaces. In embodiments, the gateway 420 also receives input from the plurality of fire alarms 440, 442, and 444. In such embodiments, when a fire alarm is activated, information pertaining to the time and duration of each strobe and/or buzzer activation of the fire alarms is communicated to the gunshot sensors, such that the gunshot sensors can compensate for the active fire alarm. In some embodiments, the compensation includes utilization of windowing techniques. In this example, a gunshot is fired at location 472, causing a projectile trajectory as indicated by path 474. In this situation, the gunshot sensor 436 is closest to the path 474. As the projectile/bullet passes by the sensor 436, a shock wave from the projectile is received by the acoustic sensors within the gunshot sensor 436. In the case of a gunshot sensor such as the sensor 340 of FIG. 3, the acoustic sensors are spaced apart by a distance D. In this configuration, each acoustic sensor within the gunshot sensor receives the shock wave at a slightly different time. This difference in time can be used to infer information about the gunshot, such as the approximate direction from which the projectile was fired, and/or the approximate speed of the projectile.

The gunshot sensors can be deployed throughout an indoor space. The indoor space can include rooms such as hotel rooms, hospital rooms, and classrooms; hallways; common areas such as lounges, meeting rooms, and lobbies; gymnasiums, cafeterias, stairwells, and restrooms; and so on. Therefore, the gunshot sensors can be used to determine that a gunshot event has occurred and this occurrence can be determined independently of the specific position of the gunshot sensor(s). Thus, the gunshot sensors do not require knowledge of their position and the gunshot detection system does not require knowledge of the specific locations of the sensors. The goal of gunshot detection analysis is to accurately detect that a gunshot has occurred.

Environmental and manmade sources can confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or another shiny object. An example of a manmade source is a strobe. Strobes are ubiquitous and are used to serve many purposes including emergency and danger warnings, alerts, and so on. Strobes are commonly deployed in buildings for purposes such as fire alarms and other warning systems, and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g. dance clubs), halogen lights, etc. A strobe flash contains visible light spectra and can "bleed over" into other spectra, including infrared, which can cause a false gunshot detection. In embodiments, analysis is performed to detect that a number of strobes have occurred and that these occurrences create a problem for gunshot evaluation. In some cases, an environmental cause can be determined and changes to the environment can be recommended. For instance, a gunshot sensor can be moved so that it does not pick up reflected sunlight from cars parked in a nearby parking lot that is visible through a window in a building. Other similar changes can be recommended for the gunshot sensors or for the surrounding environment.

Figure 5:
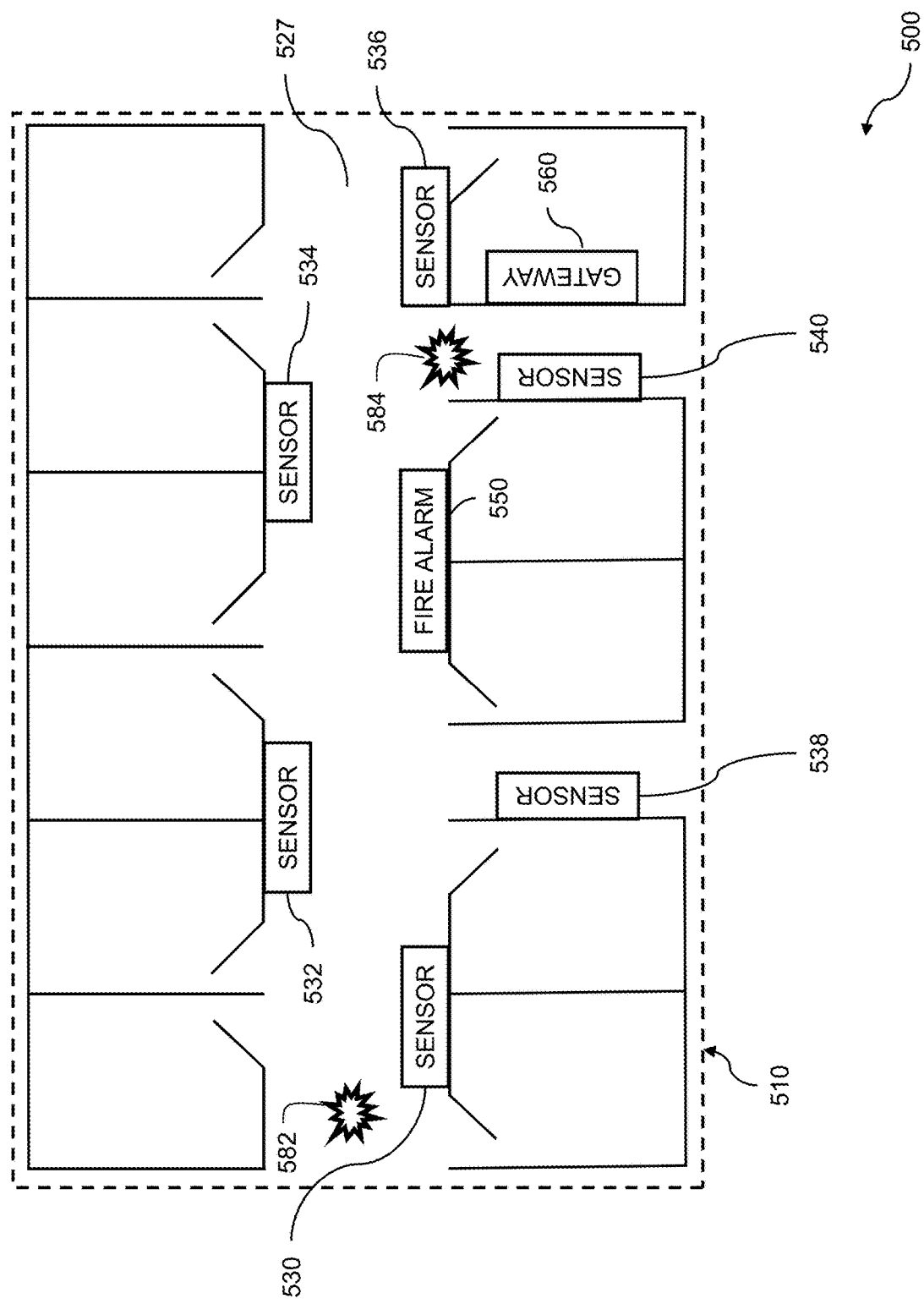
FIG. 5 is an example indoor sensor configuration in a hallway.

FIG. 5 is an example indoor sensor configuration in a hallway. The indoor area 500 has a perimeter 510 and comprises a long hallway 527. A plurality of gunshot sensors 530, 532, 534, 536, 538, and 540 are installed at various positions within the area 500. A fire alarm 550 is installed within the area 500. A gateway 560 is installed within the area 500 and is configured to receive inputs from the plurality of gunshot sensors 530, 532, 534, 536, 538, and 540. In embodiments, the gateway 560 also receives input from the fire alarm 550. In such embodiments, when a fire alarm is activated, information pertaining to the time and duration of each strobe and/or buzzer activation of the fire alarm is communicated to the gunshot sensors, such that the gunshot sensors can compensate for the active fire alarm. In some embodiments, the compensation includes utilization of windowing techniques. In this example, a first gunshot is fired at a location 582 and is primarily detected by the sensor 530. A second gunshot is later fired at a location 584 and is primarily detected by the sensors 540, 534, and 536. Information from each gunshot sensor is sent to the gateway 560, which can then perform analysis on the gunshot information and/or send the information to another system for further analysis. In embodiments, the gateway 560 sends the gunshot information to a server in the cloud via the Internet. In this way, assailants cannot damage or destroy the forensic evidence, even if they attempt to destroy equipment at the premises. Analysis in accordance with disclosed embodiments can correlate the IR signatures from the sensors 534, 536, and 540 to determine that the inputs received from the sensors 534, 536, and 540 all pertain to the same gunshot fired at the location 584, while the gunshot fired at the location 582 and detected primarily by the gunshot sensor 530 is a different gunshot event. Hence, disclosed embodiments are well-suited for detecting multiple gunshots in an indoor environment, including an indoor environment comprising a long hallway, such as what is often found in a school.

Figure 6A:
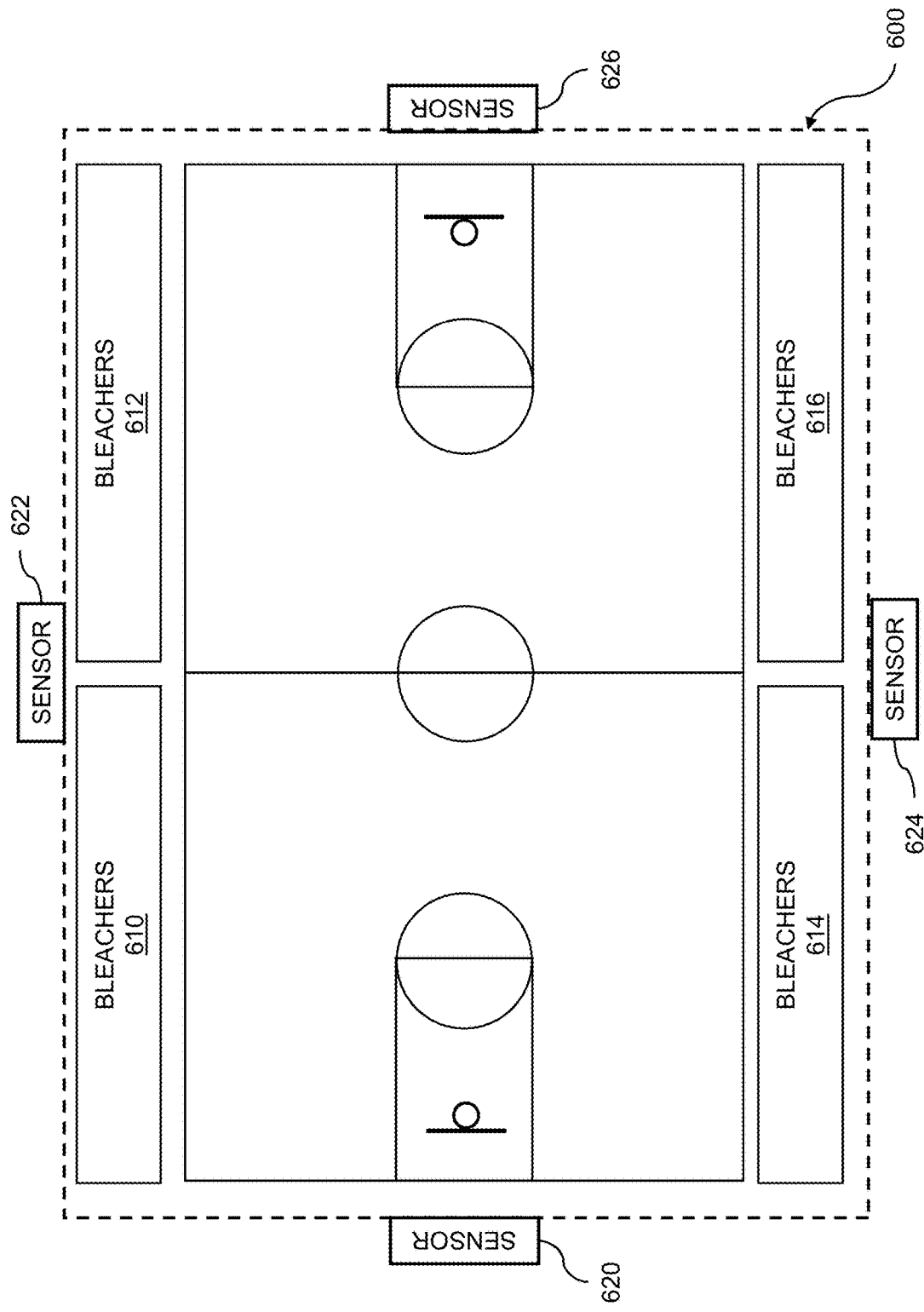
FIG. 6A is an example indoor sensor configuration with four sensors.

FIG. 6A is an example indoor sensor configuration with four sensors as installed in a gymnasium area. In such an embodiment, four gunshot sensors 620, 622, 624, and 626 are installed in an area 600. One gunshot sensor is installed on each wall of the gymnasium area to provide ample coverage of the area 600. Loud noises from events such as closing or opening the bleachers 610, 612, 614 and 616 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 6B:
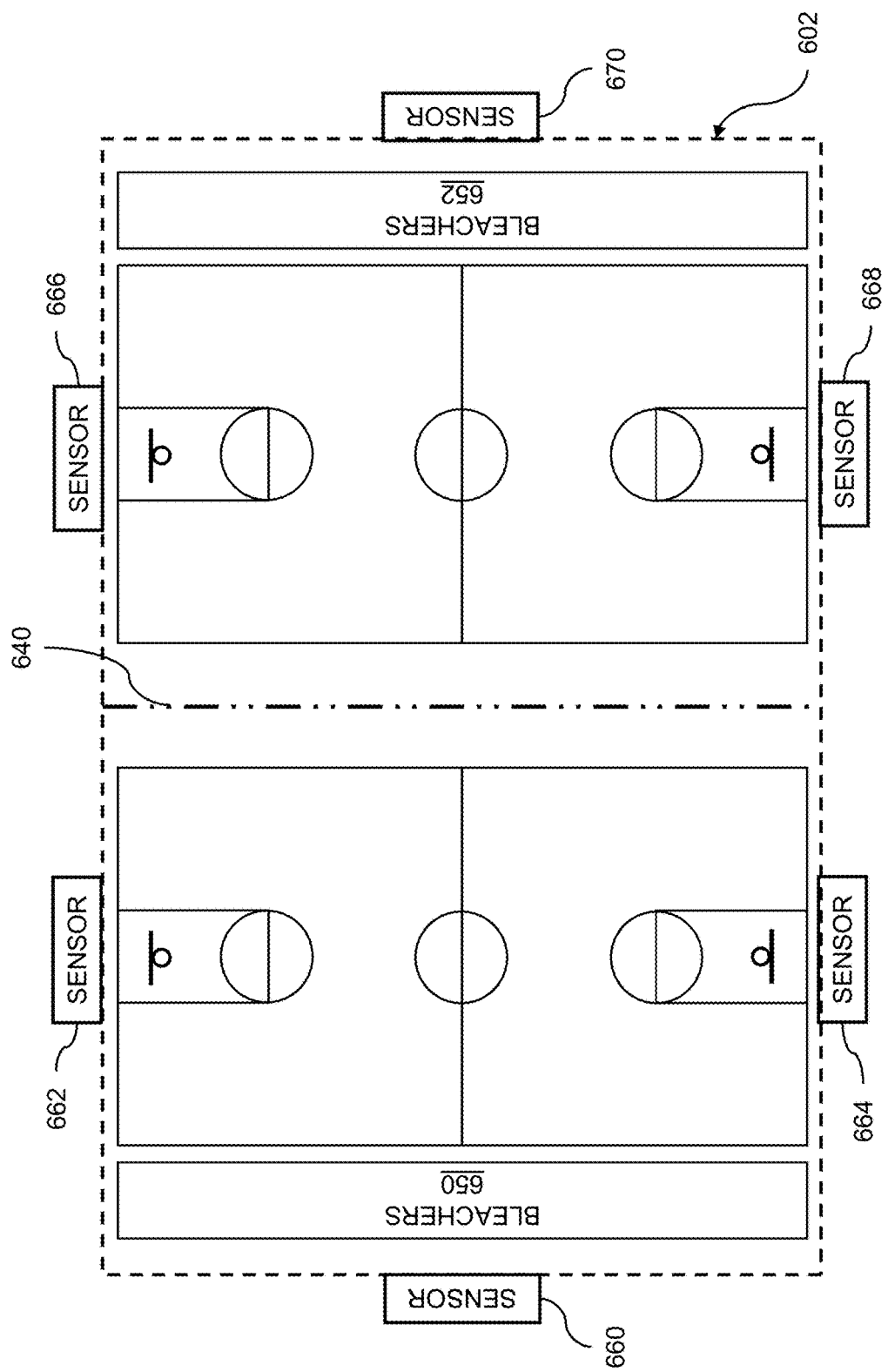
FIG. 6B is an example indoor sensor configuration with six sensors.

FIG. 6B is an example indoor sensor configuration with six sensors installed in a split gymnasium area 602. As is common in a school gymnasium, a partition wall 640 can be extended to partition a gymnasium into two smaller areas. In such situations, a six-gunshot sensor configuration can be used, including the gunshot sensors 660 and 670 on the shorter walls of the gymnasium, and the gunshot sensors 664, 668, 662, and 666 installed on the longer walls of the gymnasium. Loud noises from events such as closing or opening the bleachers 650 and 652 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 7:
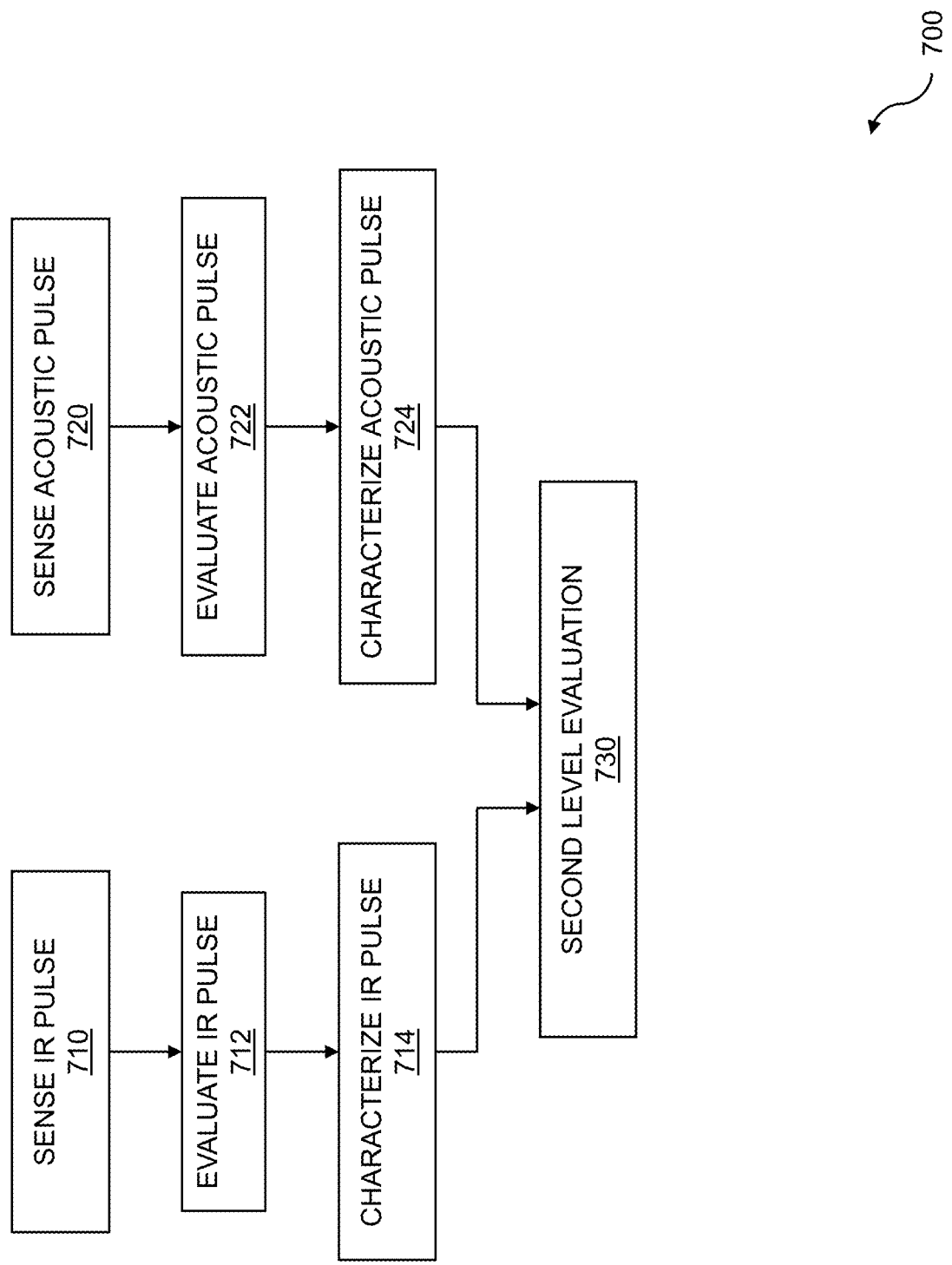
FIG. 7 is a logic flow diagram for signal analysis.

FIG. 7 is a logic flow diagram for signal analysis. The flow 700 includes sensing an IR pulse 710. In embodiments, the IR pulse has a duration ranging from about one millisecond to about twenty milliseconds. The duration can vary depending on the firearm. The flow 700 continues with evaluating the IR pulse 712. This can include determining peaks along different wavelengths within the range of IR acquisition. The flow 700 continues with characterizing the IR pulse 714. The characterizing can include identification of a particular peak and associating that peak with a known spectral signature from a firearm discharge.

The flow 700 includes sensing an acoustic pulse 720. The acoustic pulse can include a shock wave having a characteristic "N" shape that originates from the projectile, and/or a sound wave that originates from the firearm. The flow 700 includes evaluating the acoustic pulse 722. This can include measuring a duration of the acoustic pulse. The flow 700 includes characterizing the acoustic pulse 724. The characterizing can include identification of a particular acoustic pulse and associating that acoustic pulse with a known acoustic signature from a firearm discharge.

The flow 700 includes performing a second level evaluation 730. The second level evaluation comprises assembling results from one or more gunshot sensors. The flow 700 can comprise assembling results from the gunshot sensor along with a second gunshot sensor in a gateway device. The assembling can be accomplished independently of location for the gunshot sensor and location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as:

$$K_1 f_1(S) + K_2 f_2(I) + K_3 f_3(N)$$

where S is the shock wave information, I is the infrared information, and N is the sound wave information. The function $f_1$ returns a value based on magnitude of the shock wave. The function $f_2$ returns a value based on the spectral signature of the infrared information. The function $f_2$ can include a correlation function and/or best fit function for an infrared signature that resembles that from firearm discharge. The function $f_3$ returns a value based on the magnitude of a sound wave. $K_1$, $K_2$, and $K_3$ are constants. The constants can be set to appropriately weight each of the three inputs. When the gunshot score S exceeds a predetermined level, a gunshot is deemed to have likely occurred. A gateway device can report this information to upstream systems such as campus security systems, law enforcement systems, and the like.

Figure 8:
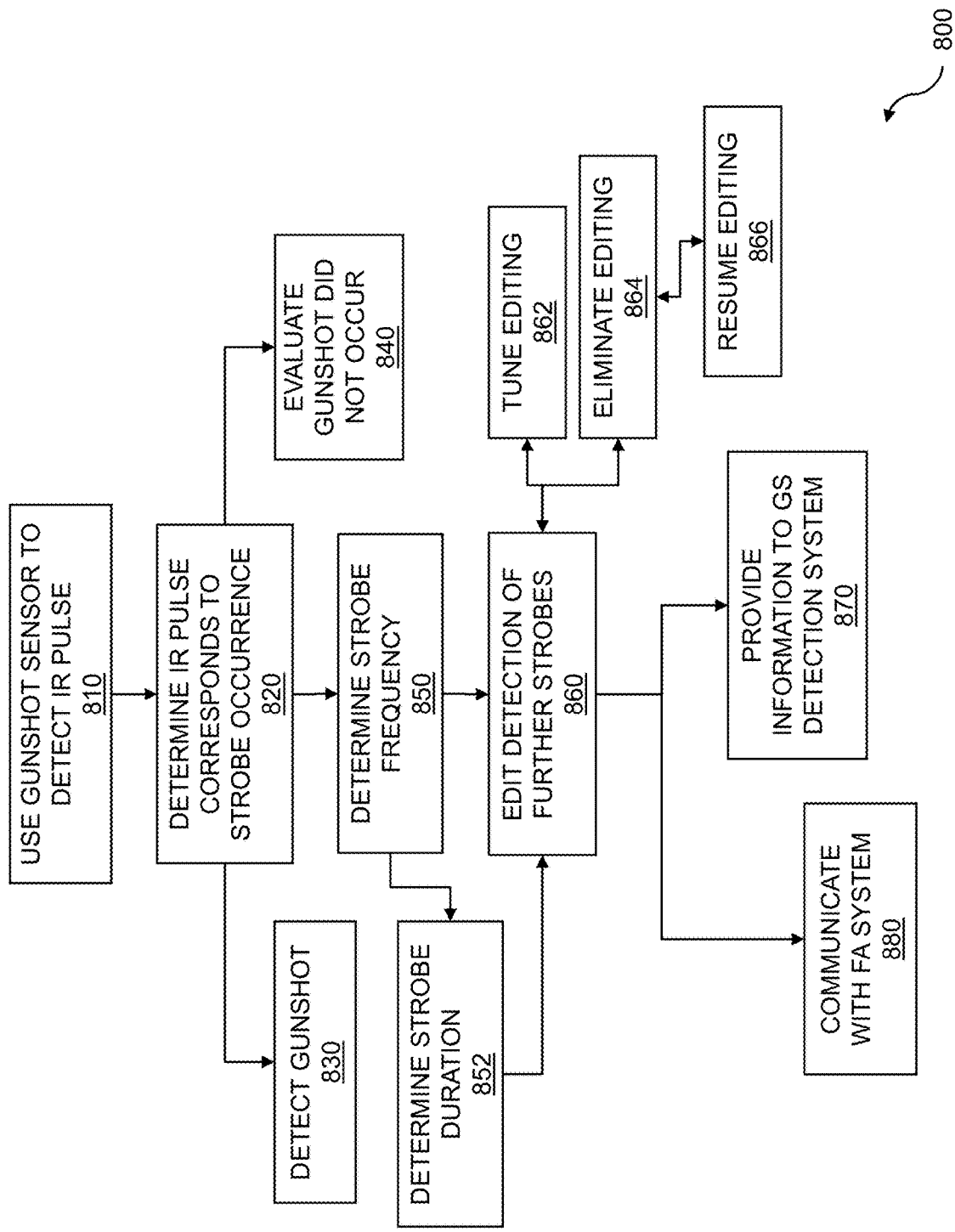
FIG. 8 is a flow diagram for gunshot analysis.

FIG. 8 is a flow diagram for gunshot analysis. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be determined to have not taken place based on the strobe occurrence. A frequency of strobe occurrences can be determined, as can a duration for the strobes within the strobe occurrences. Editing detection can edit out a time window for sensing by the infrared sensor. The flow 800 includes using a gunshot sensor to detect an infrared pulse 810, where the gunshot sensor can include an infrared sensor and an acoustic sensor. In embodiments, the gunshot sensor includes other sensors such as a microphone, a visual sensor, etc. The gunshot sensor can be placed in an outdoor location or within an indoor location. In embodiments, the gunshot sensor is mounted on a wall, on a ceiling, etc., where the wall and/or the ceiling can be in an indoor room, in a hallway, in a common space such as a lounge or meeting room, and so on.

The flow 800 includes determining that the infrared pulse corresponds to a strobe occurrence 820. A fire alarm can include a strobe that produces a visible alert and a sounder that produces an alarm, codes, voice messages, etc. Thus, a strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 800 includes evaluating that a gunshot did not occur 840 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g. 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 800 includes detecting a gunshot 830, while the fire alarm is occurring, based on information from the infrared sensor and the acoustic sensor. As previously stated, a gunshot event includes an infrared pulse and a high sound-pressure impulse. The coincidence in time of the infrared pulse and the high sound-pressure level impulse can be attributed to the gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g. no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 800 includes determining a frequency of strobe occurrences 850. The determining of the frequency of strobe occurrences can be accomplished using various techniques, such as measuring a period of time between an infrared pulse and the next infrared pulse (seconds/cycle), and inverting the time period to get frequency (cycles/second). Since the time periods between successive infrared pulses might not be equal, a time tolerance can be determined. The flow 800 includes determining a duration 852 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 800 includes editing detection of further strobe occurrences 860 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be incorrectly tagged and missed as fire alarm strobes. To reduce the analysis load, infrared pulses that correspond to strobe occurrences can be edited. Editing can include editing out a time window for sensing by the infrared sensor. By making the infrared sensor ignore infrared pulses that correspond to the fire alarm strobe or strobes, the analysis can be reserved for detecting gunshots, tracking gunshots, etc. The editing can be performed based on the strobe frequency and based on the strobe duration. The flow 800 includes tuning the editing 862 as more information on the sequence of strobes is collected. The detection of additional infrared pulses can be used to detect pulse frequency, duration, and tolerance. As more pulses are detected, the editing can be tuned to track the fire alarm strobe occurrences more accurately. Tuning can include better prediction of the time of arrival of the next infrared pulse from the fire alarm strobe, minimizing duration of the editing to reduce the amount of time the infrared sensor detection is edited out, and so on. The flow 800 includes eliminating the editing 864 once the further strobe occurrences discontinue. Fire alarms can produce strobes and produce alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 800 includes resuming the editing 866 when further strobe occurrences resume. Just as fire alarms can stop producing strobes, the fire alarms can resume producing strobes. Since the strobes from a given fire alarm are likely to be produced with the same frequency, duration, and so on, as when previously produced, the editing can be substantially similar to the editing previously applied. Instead of re-computing pulse frequency, duration, tolerance, etc. from scratch, resuming the previous editing can permit the editing to resume faster and with less processing overhead.

The flow 800 includes providing information 870 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 800 includes communicating between a fire alarm system and a gunshot detection system 880, including the gunshot sensor, so that the fire alarm system can provide a fire alarm notification to the gunshot detection system of a fire alarm, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing (e.g. infrared pulse frequency, duration, tolerance, etc.), and so on. Various steps in the flow 800 may be changed in order, repeated, omitted, or the like without departing from the disclosed concepts. Various embodiments of the flow 800 can be included in a computer program product embodied in a non-transitory computer readable medium that includes code executable by one or more processors. Thus, disclosed embodiments comprise evaluating strobe occurrence, based on the infrared information and the acoustic information, and using the strobe occurrence to provide gunshot false alert detection.

Figure 9:
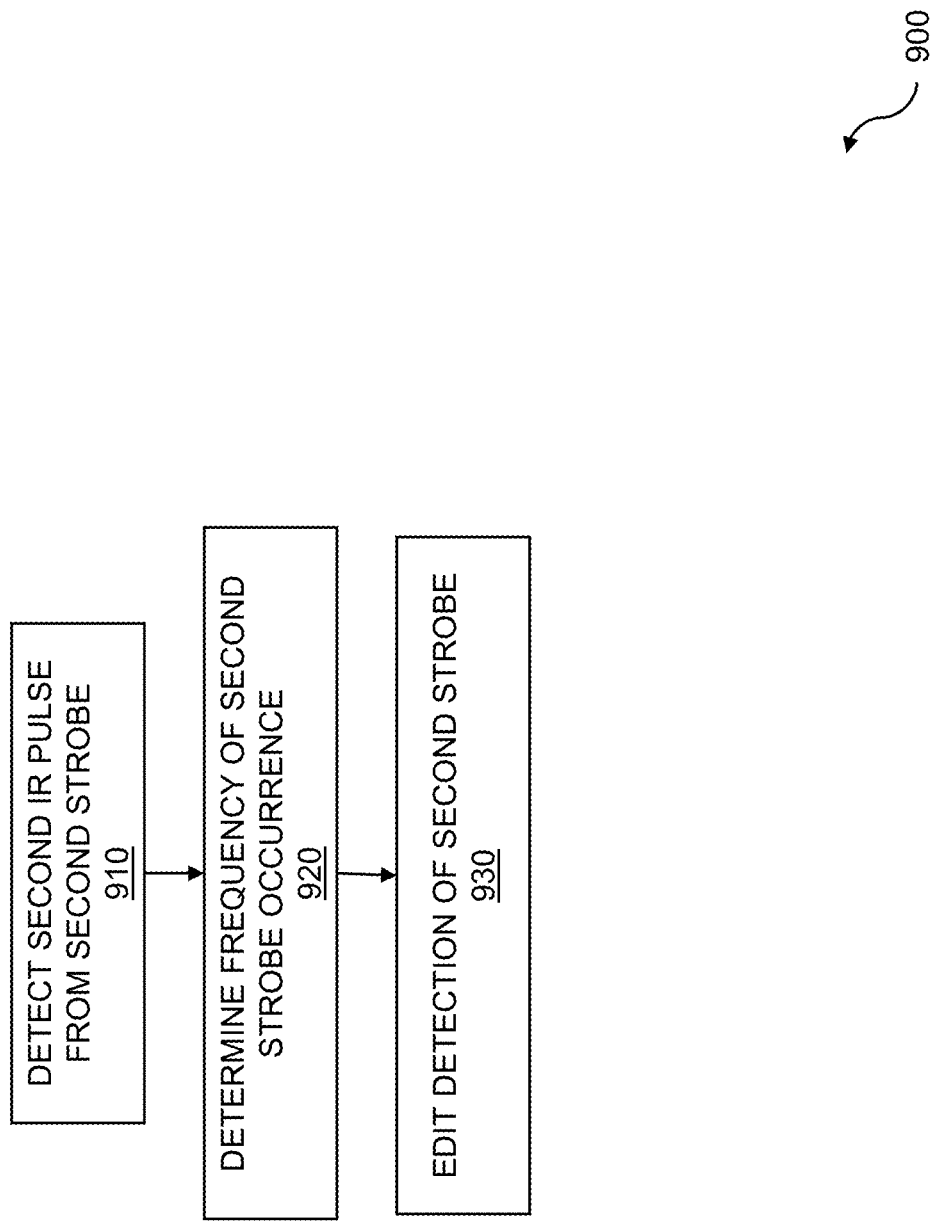
FIG. 9 is a flow diagram for second strobe evaluation.

FIG. 9 is a flow diagram for second strobe evaluation. The flow 900 can continue from or be part of the previous flow 800. The flow 900 includes detecting a second infrared pulse corresponding to a second sequence of strobes 910. The second sequence can be from a second strobe source. In certain configurations, a given gunshot detector can have a line of sight to a plurality of fire alarms. Since the fire alarms typically include strobes and sounders, the flashing of the one or more fire alarm strobes can produce infrared pulses that can be similar to infrared pulses generated by muzzle flashes from firearms. As was the case for the first sequence of strobes, the second sequence of strobes can be detected by the infrared sensor included in a gunshot sensor. The infrared pulses that result from the second sequence of strobes can be similar to the infrared pulses from the first sequence of strobes.

The flow 900 includes determining a frequency of strobe occurrence for the second sequence of strobes 920. A time period between a first strobe occurrence for the second sequence of strobes and a second strobe occurrence for the second sequence of strobes can be determined. By inverting the time period, the frequency of strobe occurrence for the second sequence of strobes can be found. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 900 includes editing detection of a second set of further strobe occurrences 930 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the frequencies for the frequency of strobe occurrences and the frequency of the second sequence of strobes are substantially similar. When the frequencies for the strobe occurrences of the first and second sequences of strobes are substantially similar, the infrared sensor can see the two fire alarm pulses as one pulse, as a pulse wider than a pulse from a single strobe, and so on. In further embodiments, frequencies for the frequency of strobe occurrences and the frequency of the second sequence of strobes are different. When the frequencies for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 900 may be changed in order, repeated, omitted, or the like without departing from the disclosed concepts. Various embodiments of the flow 900 can be included in a computer program product embodied in a non-transitory computer readable medium that includes code executable by one or more processors.

Figure 10:
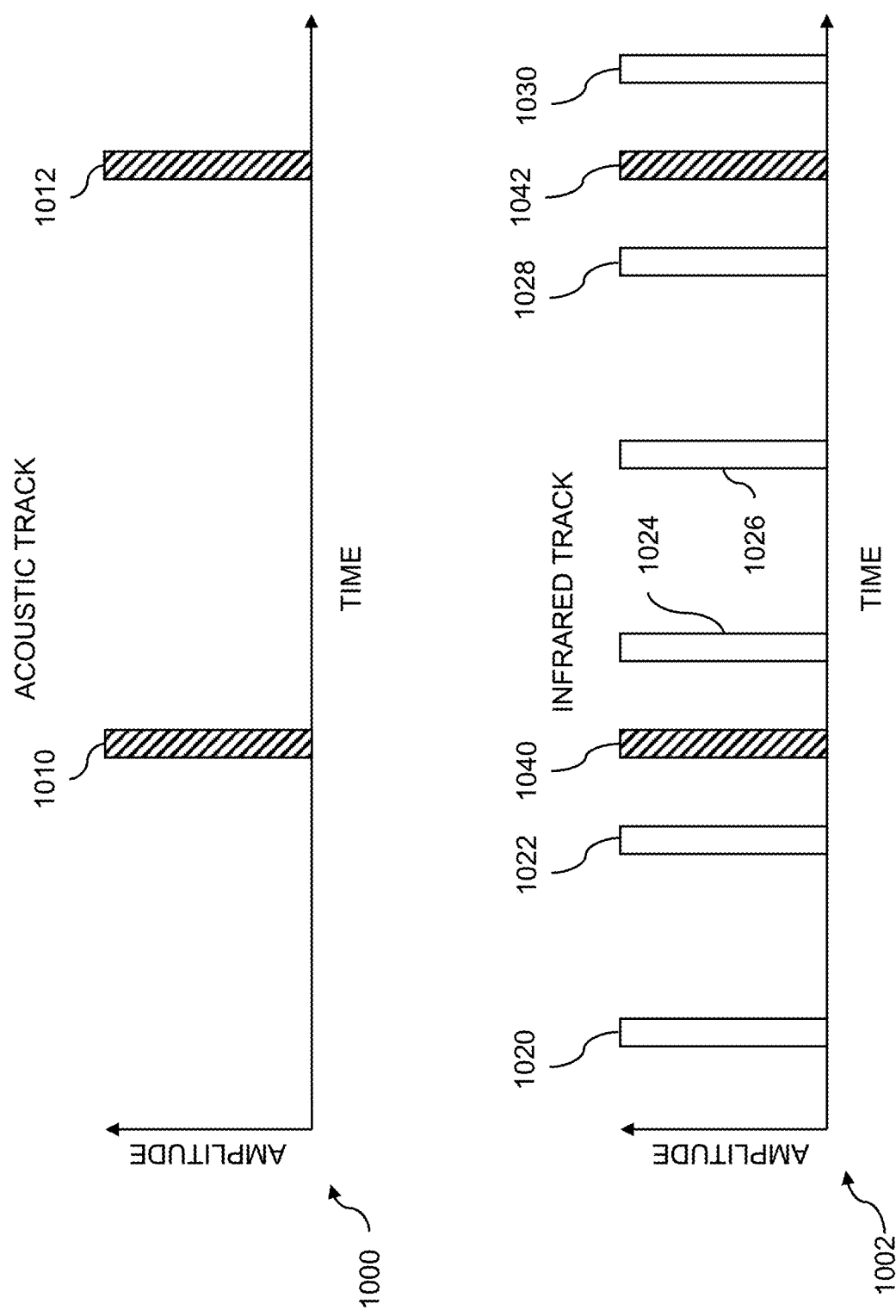
FIG. 10 is an example illustrating infrared and acoustic tracks.

FIG. 10 is an example illustrating infrared and acoustic tracks. As stated above, a gunshot sensor includes an infrared sensor and an acoustic sensor. In the event of a gunshot, the gunshot detector can detect an infrared pulse and an acoustic pulse. The infrared sensor can detect an optical flash at the muzzle of a firearm, and the acoustic sensor can detect the muzzle blast and might also detect a shock wave when the projectile expelled from the firearm is traveling at supersonic velocities. For a gunshot event, both an infrared event and an acoustic event can occur, however, the acoustic event may only comprise a muzzle blast sound and not a shock wave. In some embodiments, only a silenced or highly attenuated sound occurs.

An example acoustic track 1000 is shown. In the event of one or more gunshot events, the acoustic sensor can detect high sound-pressure level waves 1010 and 1012. An impulse can result for each gunshot event that occurs. An infrared track 1002 is shown. Infrared pulses can result from a high intensity light strobe such as the strobe coupled to a fire alarm. Such pulses corresponding to a strobe occurrence can include pulses 1020, 1022, 1024, 1026, 1028, and 1030. Infrared pulses can result from an optical flash at the muzzle of a firearm. Such pulses corresponding to an optical flash can include pulses 1040 and 1042. The infrared track 1002 shows that infrared pulses alone might not distinguish between a strobe occurrence and an optical flash. A gunshot can be detected, while the fire alarm is occurring, based on information from the infrared sensor and the acoustic sensor. As shown by the track 1000 and 1002, the overlap between the acoustic track pulses is associated with one or more gunshots, and the overlap between the infrared track pulses is associated with the gunshots. That is, the coincidence of the acoustic track pulses and the infrared track pulses can be used to detect a true gunshot. Conversely, when there is not a pulse on the acoustic track that corresponds to a pulse on the infrared track, then the source of the infrared pulse is likely not a gunshot. The acoustic sensor can sense an absence of an acoustic pressure wave corresponding to a gunshot during a timeframe of the strobe occurrence.

Figure 11:
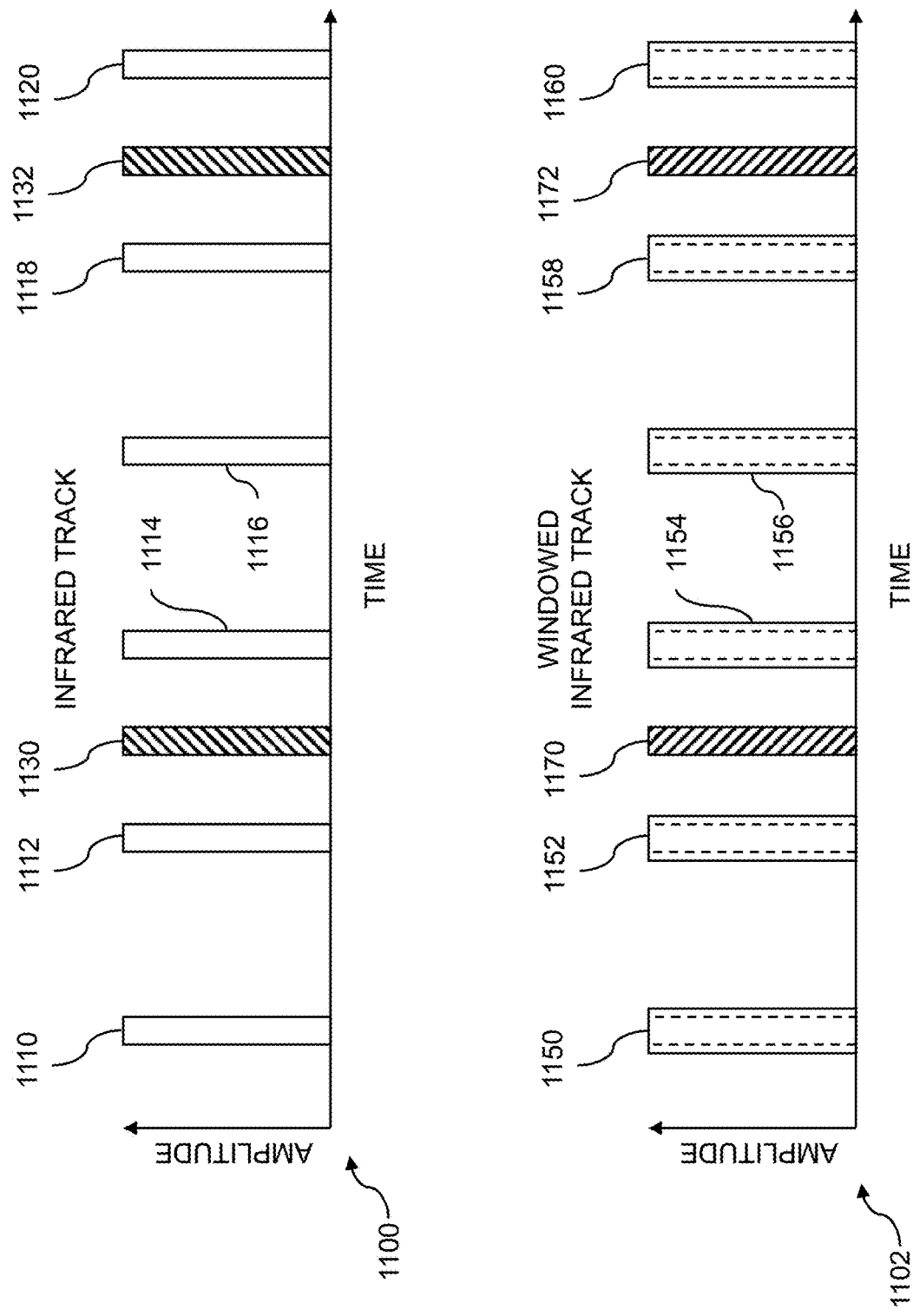
FIG. 11 is an example illustrating infrared and windowed infrared tracks.

FIG. 11 is an example showing infrared and windowed infrared tracks. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be evaluated to have not occurred based on the strobe occurrence. A frequency of strobe occurrences can be determined, as can a duration for the strobes within the strobe occurrences. Editing detection can edit out a time window for sensing by the infrared sensor. An infrared track 1100 is shown. As time progresses, a train of infrared pulses at the same amplitudes or at differing amplitudes can occur, where the pulses can correspond to strobe occurrences from a strobe. The strobe can be associated with an ongoing fire alarm. In the example 1100, using a gunshot sensor to detect an infrared pulse can detect an infrared pulse corresponding to a strobe. The strobe occurrence can be part of a sequence of strobes. Pulses 1110, 1112, 1114, 1116, 1118, and 1120 can correspond to such a sequence of strobes. An infrared pulse can correspond to one or more gunshots, represented by pulses 1130 and 1132. A frequency of strobe occurrences can be determined by detecting a train of pulses, determining the period between pulses, and inverting the period to find frequency. The duration of strobes within the strobe occurrences can be determined. The duration of strobes can be determined by calculating the time difference between time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 1102 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small edited time window can avoid missing infrared pulses that might actually be gunshots. Based on the frequency of strobe occurrence for the sequence of strobes, or pulses, 1110, 1112, 1114, 1116, 1118, and 1120, the strobes from the sequence can be edited as strobes, represented by pulses 1150, 1152, 1154, 1156, 1158, and 1160. Since the infrared pulses 1130 and 1132 can correspond to gunshot events, the pulses 1130 and 1132 can be left unedited as pulses 1170 and 1172, respectively. In some embodiments, the fire alarm(s) communicate an activated status to a gateway, which then conveys the information to the gunshot sensors. The communication can include information pertaining to the fire alarm buzzer and/or strobe pattern. In response, the gunshot sensors can perform the aforementioned windowing based on the information conveyed from the fire alarm(s).

Figure 12:
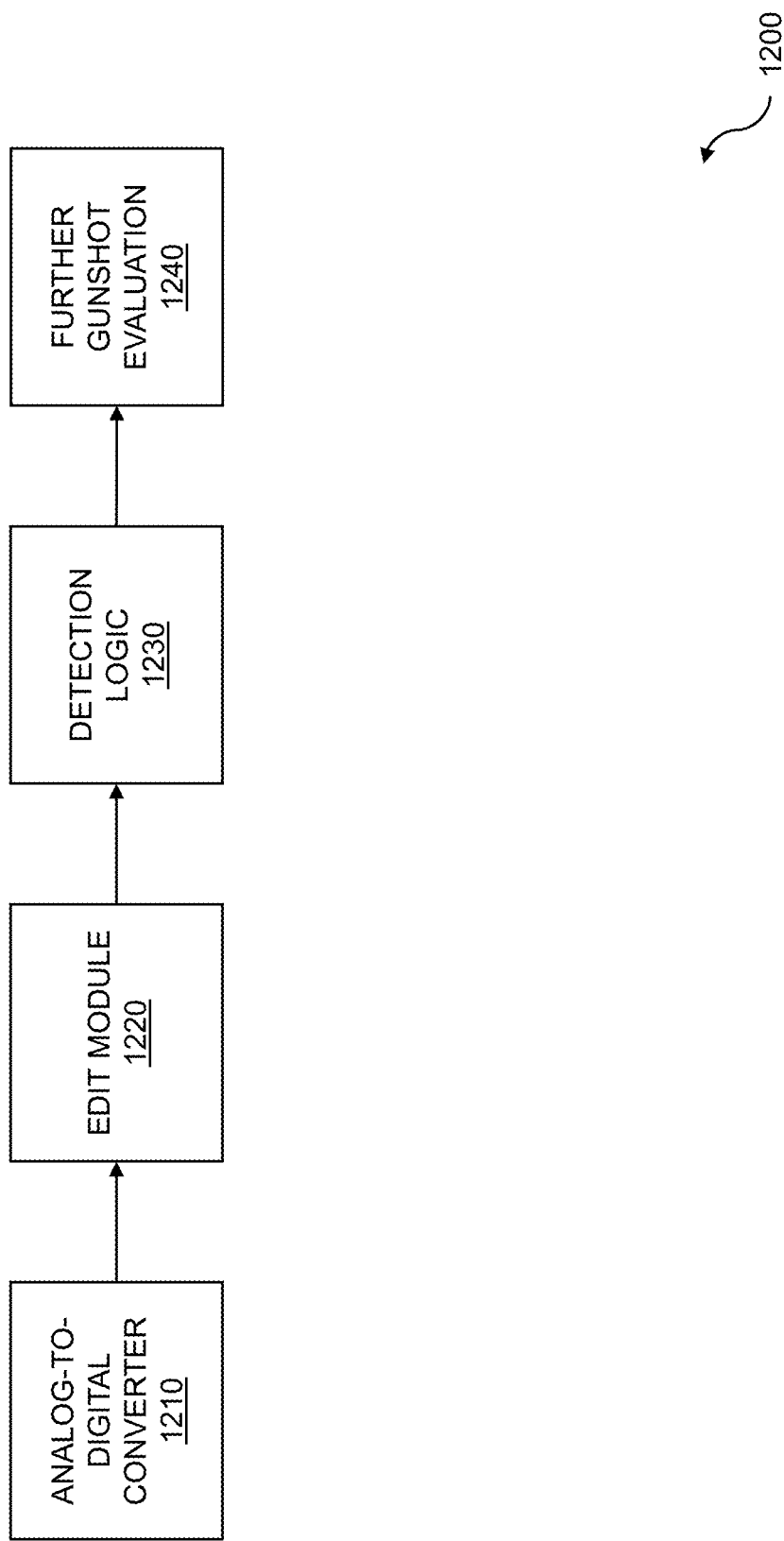
FIG. 12 is an example illustrating signal editing components.

FIG. 12 is an example illustrating signal editing components. Gunshot detection analysis can use a gunshot sensor to detect an infrared pulse, where the gunshot sensor can include an infrared sensor and an acoustic sensor. The example 1200 shows signal editing components for indoor gunshot detection analysis with an ongoing fire alarm. The signal editing components can be included in a gunshot sensor or can be external to the gunshot sensor. The signal editing components can be implemented in hardware, software, or a combination thereof. The signal editing components can include a processor and software to configure the processor. The signal editing components can be implemented with integrated circuits, can be cloud-based, and so on. The gunshot sensor can include an analog-to-digital converter 1210 and logic to perform gunshot detection, and the analog-to-digital converter 1210 can be interposed between the infrared sensor and the logic. The logic can be edit logic. The analog-to-digital converter can operate on the pulses received from the infrared sensor or sensors and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 1220. As previously stated, editing can include editing detection, where editing detecting can edit out a time window for sensing by the infrared sensor. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 1230. The detection logic 1230 can be coupled to the edit module 1220. The logic to perform gunshot detection can include a processor, as well as software to configure the processor to perform the gunshot detection. The gunshot detection can determine that an infrared pulse corresponds to a strobe occurrence and can evaluate whether a gunshot did or did not occur. The detection technique can be edited. The editing detection can be accomplished by the processor based on software to configure the processor to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, antialiasing, and so on. The signal editing components can include further gunshot evaluation 1240. The further gunshot evaluation component 1240 can be coupled to the detection logic 1230. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, and so on. Various embodiments of the example 1200 illustrating signal editing components can be included in a computer program product embodied in a non-transitory computer readable medium that includes code executable by one or more processors.

Figure 13:
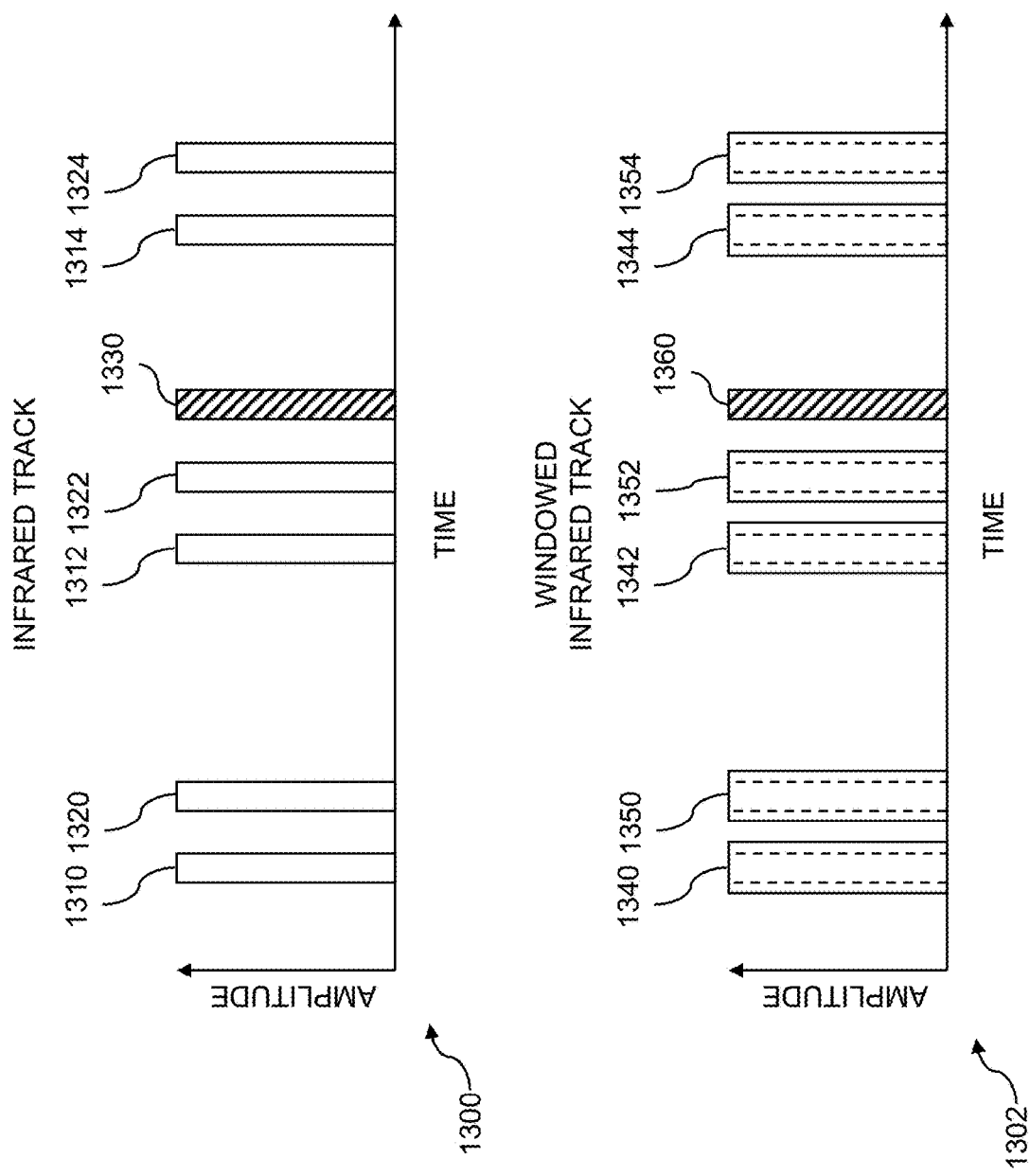
FIG. 13 is an example showing editing for multiple strobes.

FIG. 13 is an example showing editing for multiple strobes. In the presence of multiple strobes, editing detection can edit out multiple time windows for sensing by the infrared sensor. An infrared track 1300 is shown. As time progresses, a train of infrared pulses at the same amplitudes or at differing amplitudes can occur that can correspond to strobe occurrences from one or more strobes. In track 1300, using a gunshot sensor to detect an infrared pulse can detect a second infrared pulse corresponding to a second sequence of strobes. Pulses 1310, 1312, and 1314 can correspond to strobe occurrences of a first strobe, and pulses 1320, 1322, and 1324 can correspond to strobe occurrences of a second strobe. In practice, any number of strobe occurrences can be present. An infrared pulse can correspond to a gunshot, represented by pulse 1330. As was the case for a single strobe, where a frequency of strobe occurrences for the first sequence of strobes was determined, a frequency of strobe occurrences for the second sequence of strobes can also be determined. The results of determining a frequency of strobe occurrences, for a second sequence of strobes, can be editing detection of a second set of further strobe occurrences, based on the frequency of second sequence of strobes. A windowed infrared track 1302 is shown. Based on the frequency of strobe occurrence for the first sequence of strobes, represented by pulses 1310, 1312, and 1314, the strobes from the first sequence can be edited to pulses 1340, 1342, and 1344, respectively. Similarly, based on the frequency of strobe occurrence for the second sequence of strobes, represented by pulses 1320, 1322, and 1324, the strobes from the second sequence can be edited to pulses 1350, 1352, and 1354, respectively. Since the infrared pulse 1330 can correspond to a gunshot event, the pulse 1330 can be left unedited as pulse 1360.

Editing detection to edit out a time window for sensing by the infrared sensor infrared pulses corresponding to the first sequence of strobe occurrences, and editing detection to edit out a time window for sensing by the infrared sensor infrared pulses corresponding to the second sequence of strobe occurrences, can be dependent not only on the frequencies of the first sequence of strobe occurrences and the second sequence of strobe occurrences, but also on the durations of each sequence of strobe occurrences and the separation between the two sequences. Frequencies for the strobe occurrences and the second sequence of strobes can be substantially similar. Differentiating between the two sequences can be complex, since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the strobe occurrences and the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 14:
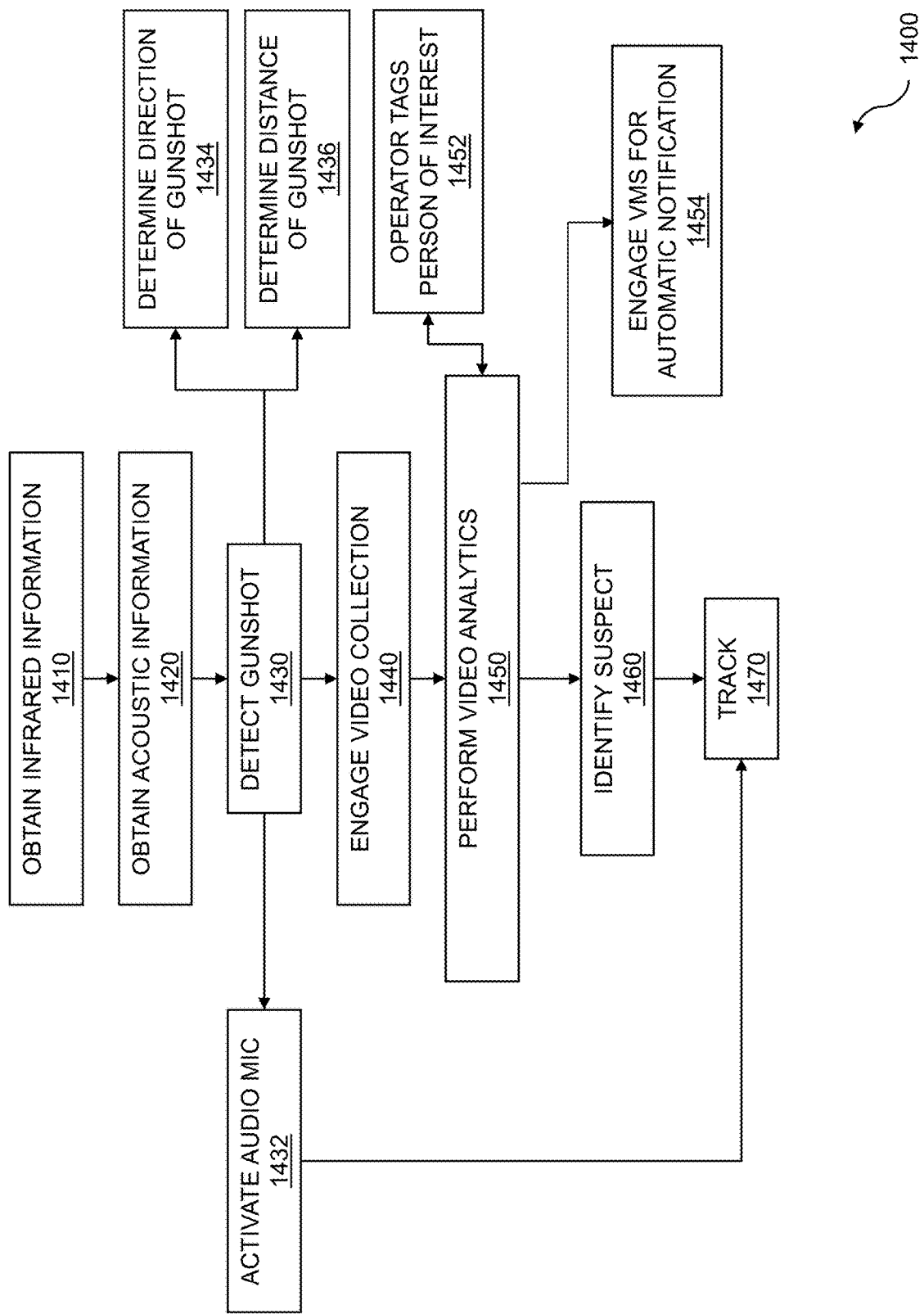
FIG. 14 is a flow diagram for gunshot analysis.

FIG. 14 is a flow diagram for gunshot analysis. The flow 1400 can comprise a processor-implemented method for gunshot analysis. Indoor gunshot detection can be based on infrared information and acoustic information, where both types of information can be obtained within an indoor environment. Video collection can be engaged based on the detecting of the gunshot. Video analytics can be performed for tracking a suspected shooter using the collected video. An audio microphone can be activated based on the detection of the gunshot. The tracking of the shooter can be further based on the audio microphone that can be activated. The flow 1400, or portions thereof, can be implemented using a semiconductor chip, a handheld device, a mobile device, a server, a cloud processor, and so on. The flow 1400 describes indoor gunshot detection with video analytics. The flow 1400 includes obtaining and/or collecting infrared (IR) information within an indoor environment 1410. The indoor environment can include an interior of a building. The indoor environment can include a plurality of hallways and a plurality of rooms, meeting rooms, an auditorium, common areas, stairwells, and so on. The IR information can be obtained from an IR sensor, an IR camera, or another IR capture device. The flow 1400 includes obtaining and/or collecting acoustic information 1420 within the indoor environment. The acoustic information can be obtained from an acoustic sensor, an acoustic microphone, or another acoustic capture device. The acoustic sensor can be designed for indoor use, outdoor use, or both. The infrared information and the acoustic information can be obtained from a gunshot sensor. One or more gunshot sensors can be mounted within the indoor environment.

The flow 1400 includes detecting a gunshot 1430, in the indoor environment, based on the infrared information and the acoustic information. Embodiments include analyzing the infrared and acoustic information to determine a gunshot occurrence wherein the gunshot occurrence is determined independently of the gunshot sensor location. The detecting of the gunshot can include weighting the IR and the acoustic information, giving priority to either the IR or the acoustic information, etc. The gunshot can be detected based on an IR event such as a muzzle flash, an explosion, a fire or another heat source, and so on. The gunshot can be detected by an acoustic event such as a high sound pressure level (SPL) event. The flow 1400 includes activating an audio microphone 1432 based on the detecting of the gunshot. The audio microphone can capture audio data that can be analyzed for the gunshot detection. The audio microphone can be an audio sensor, a microphone, or another audio capture device. The audio microphone can be activated for a first limited period of time. The limited period of time at which the audio microphone can be activated can be a random time, a coincident time, where the coincident time is associated with a gunshot detection event, periodic times (e.g. take an N second sample every M seconds), and so on. The audio microphone can stay active for a second limited period of time. Audio data can be collected from the audio microphone during the second limited time period. The second limited time period can be a specific time, a variable time, an operator selected time, and so on. Information collected from the audio microphone can be discarded after a third limited period of time. The discarding of the collected audio data from the audio microphone can serve a variety of purposes including for security, privacy, confidentiality, etc.

In some embodiments, during a normal mode of operation, the microphone is connected to a pickup circuit with its gain set such that the microphone only picks up very loud noises (e.g. 130 decibels or greater), such as a muzzle blast, and does not pick up ordinary conversation. In these embodiments, the gunshot sensor transitions from a normal mode and can enter a surveillance mode once a gunshot has been detected. In the surveillance mode, the gain of the microphone circuit can be adjusted to pick up additional sounds such as voices, so that information regarding the emergency situation caused by the gunshot can be recorded and/or relayed to law enforcement.

In embodiments, a system for gunshot detection covers an indoor environment, where the indoor environment can include a plurality of gunshot sensor units. Each gunshot sensor can include two infrared sensors, two acoustic sensors, a microphone, and a processor. The two acoustic sensors can be attenuated so that a high SPL event that might occur does not saturate or deafen the acoustic sensors. The acoustic sensors can be "tuned" or designed to ignore voices using various techniques, including electronic filtering, mechanical filtering, SPL, and so on. The gunshot sensor can include a plurality of video cameras and an analyzer, coupled to the plurality of gunshot sensor units and the plurality of video cameras, where the analyzer can detect a gunshot in the indoor environment based on the infrared information and the acoustic information collected from the plurality of gunshot sensor units; and can perform video analytics, based on video obtained from the plurality of video cameras, where the video analytics can track a suspected shooter using the video that is collected. The plurality of gunshot sensor units can be utilized to locate where the gunshot occurred, a distance from a gunshot sensor to the gunshot source, etc.

The flow 1400 includes determining direction of the gunshot 1434 relative to a gunshot sensor unit. The determining the direction of the gunshot can be accomplished using the two IR sensors, where the two IR sensors can be pointed to cover different fields of view. Depending on the orientation of the gunshot sensor unit (such as over a door, on a ceiling, on a wall, etc.), the IR sensors can be pointed left and right, up and down, both down, both up, and so on. In embodiments, the two acoustic sensors are pointed in different directions. The acoustic sensors can be pointed in directions similar to or different from the IR sensors. The flow 1400 includes using the infrared information and the acoustic information to determine distance of the gunshot 1436 from a gunshot sensor unit. The distance of the gunshot from the gunshot sensor can be determined by a variety of techniques and times, such as using the time difference between the arrivals of the IR signal and the acoustic signal. In embodiments, a single gunshot sensor provides a distance to a shooter. The distance can be determined based on calculations using differences between the speed of light and speed of sound along with evaluating the short time differences between detection of an IR signal and detection of an associated acoustic signal for a gunshot.

The flow 1400 includes engaging video collection 1440, based on the detecting of the gunshot. The engaging of the video collection can be based on the IR information and the acoustic information that was collected. The video collection can be performed by a video camera, a still camera, a video sensor, and so on. In embodiments, the gunshot sensor is coupled to a video camera. The flow 1400 includes performing video analytics 1450 for tracking a suspected shooter using the video that is collected. The performing video analytics can include identifying people, objects, firearms, etc. The video analytics can utilize image classifiers. The image classifiers can be used to identify characteristics about a gunshot event, a suspect shooter, and so on. The image classifiers can be used to identify a gun type. For example, the image classifiers can be used to identify a gun type such as a revolver, a semiautomatic handgun, etc., and/or to estimate or determine ammunition capacity. The flow 1400 includes tagging a person of interest by an operator 1452 of a gunshot detection system. The operator can be a human operator who is managing the gunshot detection system.

The flow 1400 includes engaging a video management system (VMS) for automatic notifications 1454. A video management system typically provides video collection from cameras, recordation and storage of the video, and access to live and recorded version of the video. In embodiments, the VMS is used to further provide automatic notifications of a shooting event in near-real-time per a predetermined protocol. For example, the flow 1400 can include sending automatic notification to law enforcement officials, facility officials, municipal officials, school officials, news agencies, mass notifications, and the like. The notifications can include digital radio notifications, email notifications, text message notifications, phone call notifications, web-site notifications, voice mail notifications, and so on. In embodiments, a system for gunshot detection covers an indoor environment, wherein the system provides automatic notifications based on the analyzing to determine the gunshot occurrence and the evaluating to provide gunshot false alert detection.

The flow 1400 includes identifying the suspected shooter 1460 based on the video analytics. The video analytics can be used to identify a suspected shooter with techniques such as identifying a person within a room, in a hallway, in a stairwell, etc. The video analytics can be used to identify facial features, facial landmarks, and other distinguishing characteristics of a suspected shooter. The flow 1400 includes tracking the shooter 1470. As discussed above, video analytics can be used for tracking a suspected shooter. Other information, including IR, acoustic, and audio information can be used for tracking. The tracking of the suspected shooter can be further based on the audio microphone 1432 that was activated. The audio microphone can be used to collect speech data, motion data, etc., from the suspected shooter. The tracking can be accomplished with operator oversight. The operator can be a human operator who is interacting with the gunshot detection system. The operator with oversight of the gunshot detection system can control tracking, supervise tracking, monitor tracking, and so on. The tracking can be based on tagging a person of interest by the operator. The operator can tag a person of interest by selecting the person, placing an electronic tag on the person, isolating the person from among other people, and so on. The tracking can be based on clothing, body type, facial features, weapons, or motion. The video analytics and the image classifiers can be used to identify clothing type and color; body type such as tall, short, overweight, or thin; facial features such as distinguishing characteristics; weapon numbers and types; the direction of suspected shooter motion, etc. Various steps in the flow 1400 may be changed in order, repeated, omitted, or the like without departing from the disclosed concepts. Various embodiments of the flow 1400 can be included in a computer program product embodied in a non-transitory computer readable medium that includes code executable by one or more processors.

Figure 15:
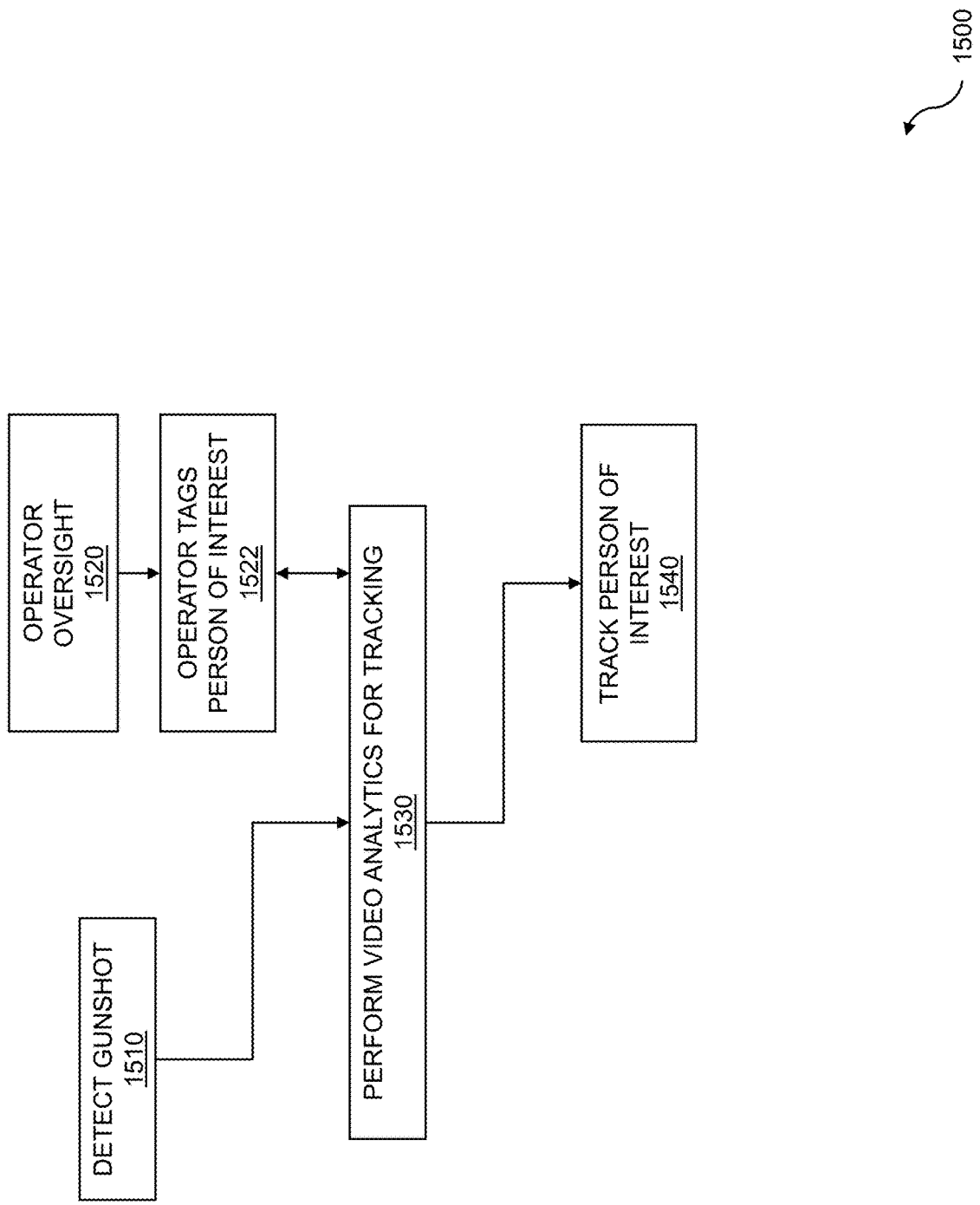
FIG. 15 is a flow diagram for analytics usage.

FIG. 15 is a flow diagram for analytics usage. Indoor gunshot detection can be based on infrared information and acoustic information, where both types of information can be obtained within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. The flow 1500 includes detecting a gunshot 1510, in an indoor environment, based on infrared information and acoustic information. As discussed above, the infrared information can be obtained within an indoor environment, and the acoustic information can be obtained within the indoor environment. The flow 1500 includes operator oversight 1520, where tracking can be accomplished by a tracking system, and the operator oversight can be oversight by a human operator of the gunshot detection system. The operator oversight can be used to assist gunshot detection, control gunshot detection, override gunshot detection, and so on. The flow 1500 includes tagging a person of interest 1522 by an operator of a gunshot detection system and using the video analytics (discussed above and further below) for tracking the person of interest. The tagging by the operator can be used to assist in the tracking of the person of interest, enhance tracking, control tracking, etc.

The flow 1500 includes performing video analytics for tracking a suspected shooter 1530 using the video that is collected. The video analytics can use image classifiers, where the image classifiers can be used to identify various characteristics in the video that can be collected. The classifiers can be used to identify a gun type. The gun type can include a handgun, a long gun, etc., and can further identify whether the gun is a revolver, a semiautomatic, or an automatic weapon. The classifiers can be used to estimate the round capacity of the gun type identified. The performing video analytics for tracking can also be used to identify a suspected shooter. The flow 1500 includes tracking a person of interest 1540. The tracking can be accomplished by the gunshot tracking system and by operator oversight. As discussed above, the operator can be a human operator of an indoor gunshot detection system. The operator of the gunshot detection system can tag a person of interest, and the video analytics can be used for the tracking of the person of interest. The tracking can be based on other factors as well such as the location of the gunshot, the location of the person of interest, the direction of movement of the person of interest, and so on. The tracking can be based on clothing, body type, facial features, weapons, or motion. Various steps in the flow 1500 may be changed in order, repeated, omitted, or the like without departing from the disclosed concepts. Various embodiments of the flow 1500 can be included in a computer program product embodied in a non-transitory computer readable medium that includes code executable by one or more processors.

Figure 16:
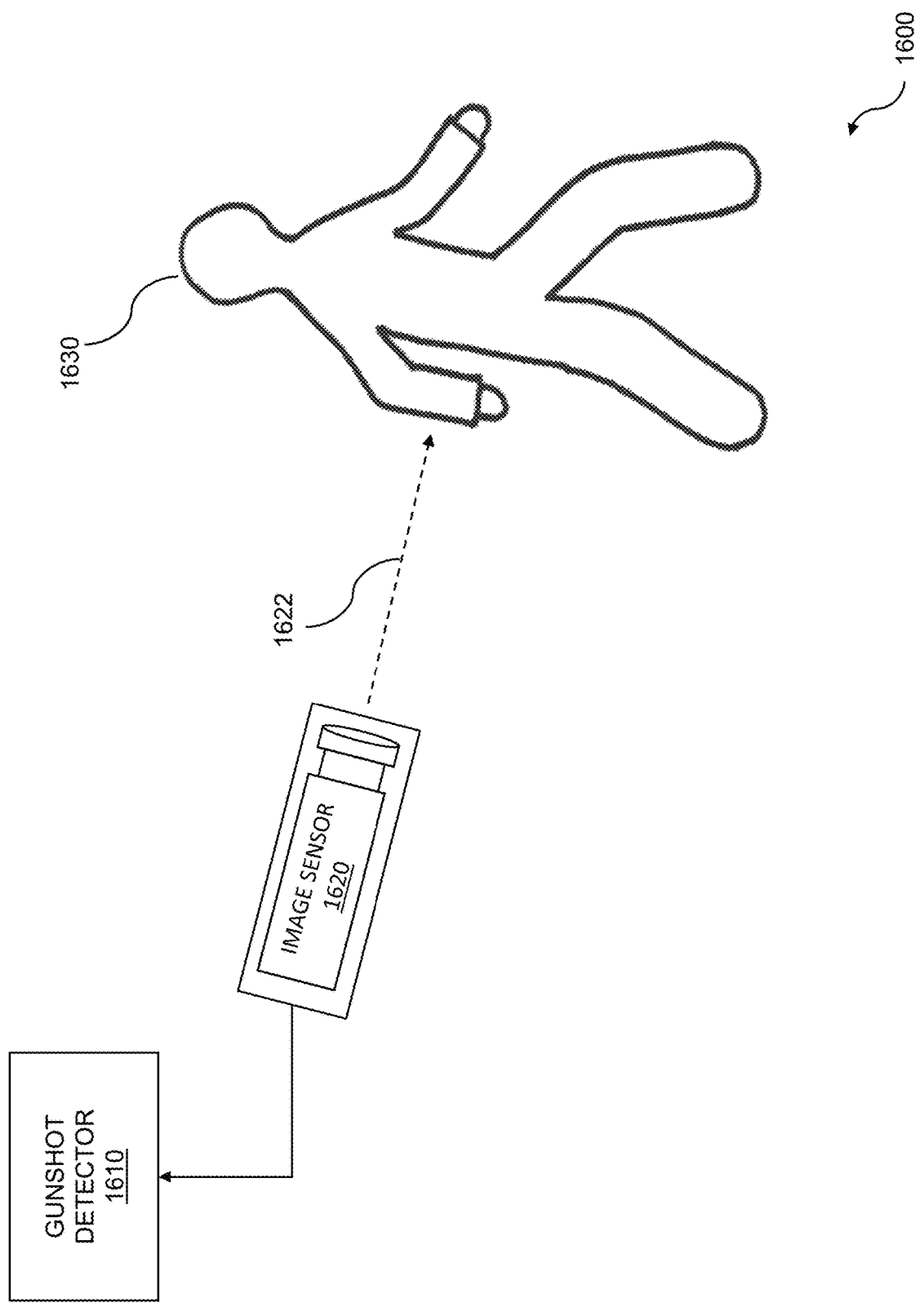
FIG. 16 is an example showing video collection.

FIG. 16 is an example showing video collection. Indoor gunshot detection can be based on infrared information and acoustic information, where both types of information can be obtained within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. An example of video collection 1600 is shown for indoor gunshot detection. A gunshot detector 1610 can be used to detect an indoor gunshot. The gunshot detector can include two infrared sensors, two acoustic sensors, a microphone, and a processor. Video collection can commence when a gunshot is detected in an indoor environment based on information obtained from the infrared sensors and the acoustic sensors. The gunshot detector 1610 can engage the video sensor 1620 for video collection. The video sensor can have a line of sight 1622 to a person 1630, where the person can be a person of interest. The video sensor 1620 can include a video camera, a still camera, or another digital image collection system or method. Video analytics can be performed on the video collected from the image sensor. The video analytics can use image classifiers to identify a gun type, to track a person of interest, and so on.

Figure 17:
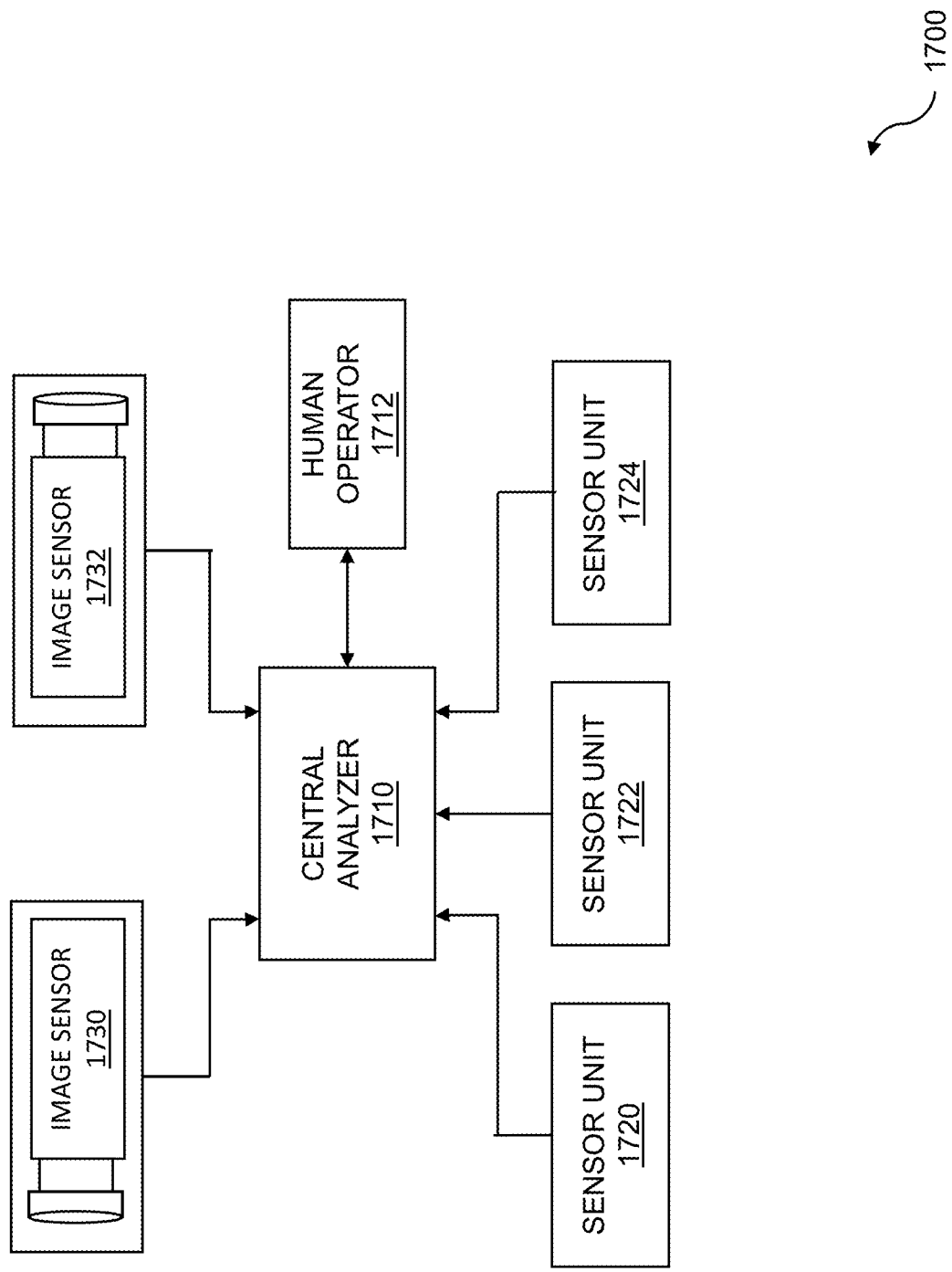
FIG. 17 is an example illustrating sensors, cameras, and a central analyzer.

FIG. 17 is an example system illustrating sensors, cameras, and a central analyzer. Indoor gunshot detection can be based on infrared information and acoustic information, where both types of information can be obtained within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Sensors, cameras, and a central analyzer can be used for indoor gunshot detection with components of a system 1700. A central analyzer 1710 can be used for detecting a gunshot in the indoor environment. The central analyzer can control the sensor units and image sensors. The central analyzer can be used to detect a gunshot, engage video collection, and perform video analytics. The central processor can interact with a human operator 1712. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1720, 1722, and 1724, a plurality of image sensors 1730 and 1732, and so on. The central analyzer can obtain infrared information and acoustic information from the sensor units. The central analyzer can be coupled to image sensors 1730 and 1732. The image sensors can be engaged by the central analyzer. The image sensors that can be used can be video cameras, still cameras, or other digital image collection systems and techniques. The central analyzer can perform video analytics, where the video analytics utilize image classifiers. The image classifiers can be used to identify a gun type. A suspected shooter can be identified based on the video analytics. As mentioned above, with oversight from the human operator 1712, where the operator can tag a person of interest, tracking of the person of interest can be conducted using video analytics performed by the central analyzer.

Figure 18:
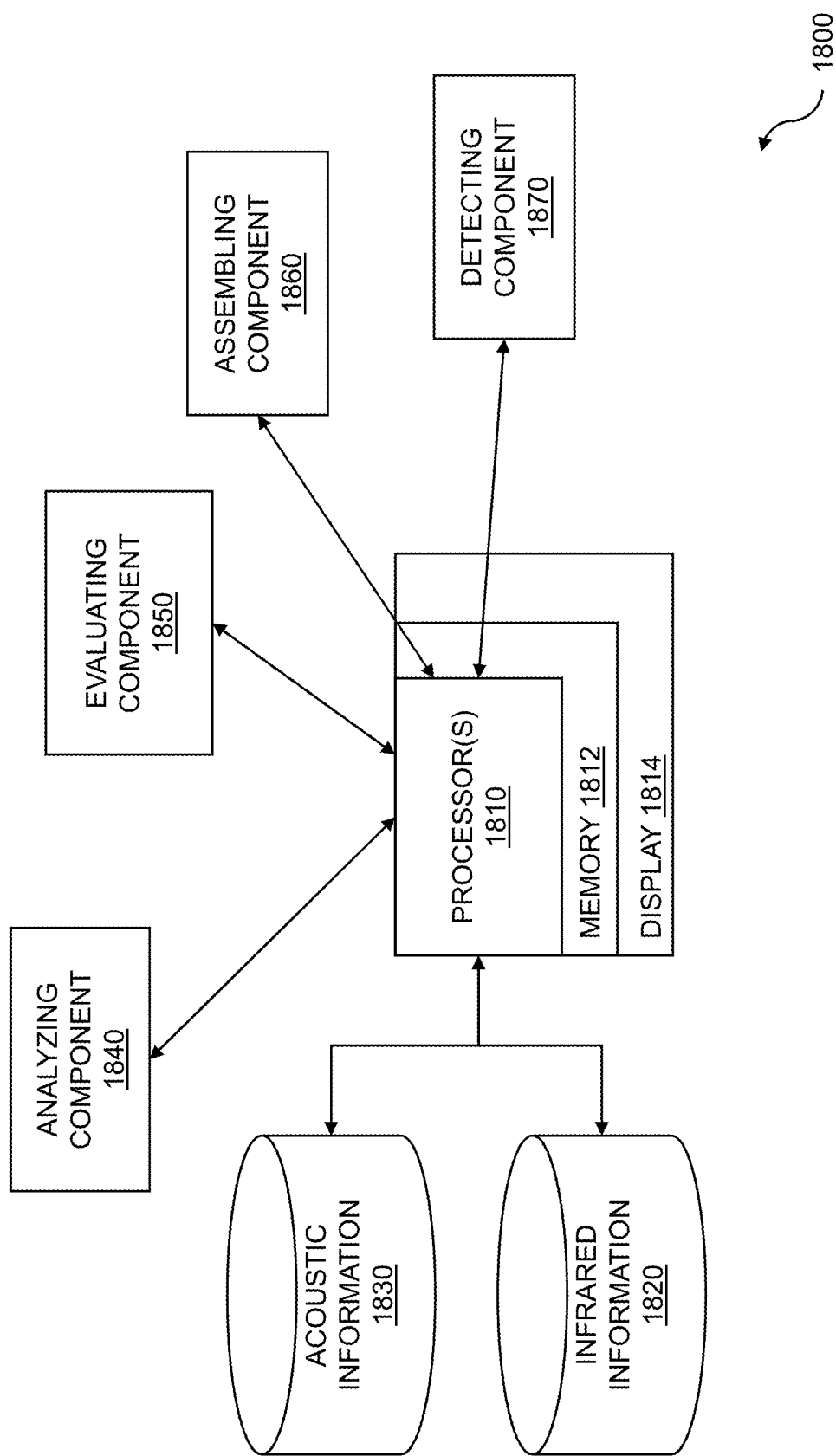
FIG. 18 is a system diagram for indoor gunshot detection.

FIG. 18 is a system diagram for indoor gunshot detection. The system 1800 can include a plurality of gunshot sensor units used for gunshot analysis, wherein each of the plurality of gunshot sensor units comprise: an infrared sensor to collect infrared information within an indoor environment; an acoustic sensor to collect acoustic information within an indoor environment; an analyzer, coupled to the plurality of gunshot sensor units, which analyzes the infrared information and the acoustic information to determine a gunshot occurrence wherein the gunshot occurrence is determined independently of the gunshot sensor location; and an evaluator, coupled to the analyzer, which evaluates strobe occurrence, based on the infrared information and the acoustic information, and uses the strobe occurrence to provide gunshot false alert detection. The system 1800 can determine that the infrared pulse corresponds to a strobe occurrence. The system 1800 can evaluate that a gunshot did not occur based on the strobe occurrence. The system 1800 can include one or more processors 1810 coupled to a memory 1812 which can store and retrieve instructions and data, and a display 1814.

The obtaining of the infrared information 1820, and the obtaining of the acoustic information 1830, can occur using the one or more processors 1810, or can occur using other processors. The obtaining of the infrared information 1820 and the obtaining of the acoustic information 1830 can occur using a wired or wireless computer network, a wired or wireless sensor network, the Internet, and so on. The infrared information 1820 can be obtained from a gunshot sensor. The gunshot sensor can include an infrared sensor. The infrared information 1820 can be obtained from a plurality of infrared sensors, and the infrared sensors can be pointed to cover different fields of view. The acoustic information 1830 can be obtained from the gunshot sensor, where the gunshot sensor can include an acoustic sensor. The acoustic information 1830 can be obtained from a plurality of acoustic sensors, and the acoustic sensors can be pointed in different directions. The acoustic sensors can be attenuated. The acoustic sensors can be configured so that they cannot detect voices.

The system 1800 can include a detecting component 1870. The detecting component 1870 can include one or more sensors, transducers, and/or detectors for detecting inputs such as infrared waves, shock waves, and/or sound waves. The system 1800 can include an assembling component 1860. The assembling component 1860 can include hardware and/or software for storing and/or packaging acquisition data for evaluation.

The system 1800 can include an evaluating component 1850. The evaluating component 1850 can include hardware and/or software for evaluating acquisition data. This can include determination of peak amplitudes, time duration of peaks, and/or infrared spectral line determinations. The system 1800 can include an analyzing component 1840. The analyzing component 1840 can include hardware and/or software for analyzing the evaluated data. This can include comparison of the evaluated data to known signature data from firearm discharge. For example, a library of various signatures from firearms of different types can be stored within system 1800. As part of analysis, the analyzing component 1840 can compare acquired data from gunshot sensors to data in the library to determine if the acquired data pertains to a gunshot, and possibly to indicate a possible firearm model and/or type that was used to create the gunshot.

The system can comprise: a plurality of gunshot sensor units used for gunshot analysis, wherein each of the plurality of gunshot sensor units comprises: an infrared sensor to collect infrared information within an indoor environment; an acoustic sensor to collect acoustic information within an indoor environment; an analyzer, coupled to the plurality of gunshot sensor units, which analyzes the infrared information and the acoustic information to determine a gunshot occurrence wherein the gunshot occurrence is determined independently of location for of a gunshot sensor; and an evaluator, coupled to the analyzer, which evaluates strobe occurrence, based on the infrared information and the acoustic information, and uses the strobe occurrence to provide gunshot false alert detection. The system 1800 can include a computer program product embodied in a non-transitory computer readable medium for gunshot analysis, the computer program product comprising code which causes one or more processors to perform operations of: collecting infrared information within an indoor environment using a gunshot sensor; collecting acoustic information within the indoor environment using the gunshot sensor; analyzing the infrared information and the acoustic information to determine a gunshot occurrence wherein the gunshot occurrence is determined independently of location for the gunshot sensor; and evaluating strobe occurrence, based on the infrared information and the acoustic information, and using the strobe occurrence to provide gunshot false alert detection.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Disclosed embodiments are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for gunshot analysis comprising:
   collecting infrared information within an indoor environment using a gunshot sensor;
   collecting acoustic information within the indoor environment using the gunshot sensor;
   analyzing the infrared information and the acoustic information to determine a gunshot occurrence wherein the gunshot occurrence is determined independently of location for the gunshot sensor; and
   evaluating strobe occurrence, based on the infrared information and the acoustic information, and using the strobe occurrence to provide gunshot false alert detection.

2. The method of claim 1 wherein the analyzing occurs irrespective of reverberations.

3. The method of claim 2 wherein the gunshot sensor collects the acoustic information wherein the reverberations from the gunshot occurrence add cumulatively to the acoustic information.

4. The method of claim 2 wherein information on the reverberations is not used in false alert of gunshot determinations.

5. The method of claim 1 wherein the analyzing occurs irrespective of reflections.

6. The method of claim 5 wherein the gunshot sensor collects the infrared information wherein the reflections from the gunshot occurrence add cumulatively to the infrared information.

7. The method of claim 5 wherein information on the reflections is not used in false alert of gunshot detection.

8. The method of claim 1 wherein the analyzing is accomplished without tuning the gunshot sensor for the indoor environment in which the gunshot sensor resides.

9. The method of claim 1 further comprising assembling results from the gunshot sensor along with a second gunshot sensor in a gateway device.

10. The method of claim 9 wherein the assembling is accomplished independently of location for the gunshot sensor and location for the second gunshot sensor.

11. The method of claim 1 wherein the strobe occurrence comprises a fire alarm.

12. The method of claim 11 further comprising detecting a gunshot, while the fire alarm is occurring, based on information from an infrared sensor and an acoustic sensor.

13. The method of claim 12 wherein the gunshot occurs at a different time from the strobe occurrence.

14. The method of claim 12 wherein the acoustic sensor senses an absence of an acoustic pressure wave corresponding to the gunshot during a timeframe of the strobe occurrence.

15. The method of claim 1 wherein the gunshot sensor comprises an infrared sensor and an acoustic sensor.

16. The method of claim 15 wherein the gunshot sensor further comprises a second infrared sensor and a second acoustic sensor.

17. The method of claim 16 wherein the infrared sensor and the second infrared sensor are pointed to cover different fields of view.

18. The method of claim 16 wherein the acoustic sensor and the second acoustic sensor do not detect voices.

19. The method of claim 1 further comprising providing automatic notifications based on the analyzing to determine the gunshot occurrence and the evaluating to provide gunshot false alert detection.

20. A processor-implemented method for gunshot analysis comprising:
   collecting infrared information within an indoor environment using a gunshot sensor;
   collecting acoustic information within the indoor environment using the gunshot sensor;
   analyzing the infrared information and the acoustic information to determine a gunshot occurrence wherein the gunshot occurrence is determined independently of location for the gunshot sensor;
   engaging video collection, based on the gunshot occurrence; and
   performing video analytics for tracking a suspected shooter for the gunshot occurrence based on the video collection.

21. A system for gunshot detection comprising:
   a plurality of gunshot sensor units used for gunshot analysis, wherein each of the plurality of gunshot sensor units comprises:
      an infrared sensor to collect infrared information within an indoor environment;
      an acoustic sensor to collect acoustic information within an indoor environment;
      an analyzer, coupled to the plurality of gunshot sensor units, which analyzes the infrared information and the acoustic information to determine a gunshot occurrence wherein the gunshot occurrence is determined independently of location for a gunshot sensor within the plurality of gunshot sensor units; and
      an evaluator, coupled to the analyzer, which evaluates strobe occurrence, based on the infrared information and the acoustic information, and uses the strobe occurrence to provide gunshot false alert detection.

22. A computer program product embodied in a non-transitory computer readable medium for gunshot analysis, the computer program product comprising code which causes one or more processors to perform operations of:
   collecting infrared information within an indoor environment using a gunshot sensor;
   collecting acoustic information within the indoor environment using the gunshot sensor;
   analyzing the infrared information and the acoustic information to determine a gunshot occurrence wherein the gunshot occurrence is determined independently of location for the gunshot sensor; and
   evaluating strobe occurrence, based on the infrared information and the acoustic information, and using the strobe occurrence to provide gunshot false alert detection.

* * * * *